United States Patent
Yoo et al.

(10) Patent No.: US 10,708,733 B1
(45) Date of Patent: *Jul. 7, 2020

(54) INITIATING TRANSPORTATION REQUESTS

(71) Applicant: Lyft, Inc., San Francisco, CA (US)

(72) Inventors: Frank Taehyun Yoo, San Carlos, CA (US); Marc Haumann, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,540

(22) Filed: Jul. 8, 2019

Related U.S. Application Data

(63) Continuation of application No. 15/842,202, filed on Dec. 14, 2017, now Pat. No. 10,349,223.

(51) Int. Cl.
| | | |
|---|---|---|
| *H04W 4/02* | (2018.01) | |
| *H04W 4/33* | (2018.01) | |
| *G06Q 50/30* | (2012.01) | |
| *H04L 29/08* | (2006.01) | |

(52) U.S. Cl.
CPC .............. *H04W 4/33* (2018.02); *G06Q 50/30* (2013.01); *H04L 67/12* (2013.01); *H04W 4/025* (2013.01)

(58) Field of Classification Search
CPC ........ H04W 4/04; H04W 4/025; H04L 67/12; G06Q 50/30
See application file for complete search history.

(56) References Cited

U.S. PATENT DOCUMENTS

| | | |
|---|---|---|
| 6,356,838 B1 | 3/2002 | Paul |
| 8,126,903 B2 | 2/2012 | Lehmann |
| 8,150,967 B2 | 4/2012 | King et al. |
| 8,392,116 B2 | 3/2013 | Lehmann et al. |
| 8,676,718 B2 | 3/2014 | Villegas |
| 9,165,074 B2 | 10/2015 | Hendrey |
| 9,230,292 B2 | 1/2016 | Amin et al. |
| 9,232,350 B2 | 1/2016 | Foy et al. |
| 9,547,309 B2 | 1/2017 | Ross et al. |

(Continued)

FOREIGN PATENT DOCUMENTS

| | | |
|---|---|---|
| EP | 2507753 A1 | 10/2013 |
| WO | WO 2010-056199 A1 | 5/2010 |

(Continued)

OTHER PUBLICATIONS

U.S. Appl. No. 13/828,913, May 20, 2015, Office Action.

(Continued)

*Primary Examiner* — Chuong A Ngo
(74) *Attorney, Agent, or Firm* — Keller Jolley Preece

(57) ABSTRACT

The present disclosure is directed toward systems and methods for generating and sending a request in response to a single user interaction. For example, in response to detecting that a single user interaction moves past a first threshold relative to a transportation request graphical user interface, the systems and methods described herein provides an estimate associated with the destination option. Then, in response to detecting that the same single user interaction with the transportation request graphical user interface moves past a second threshold relative to the graphical user interface, the systems and method generate and send a transportation request to be matched to a provider.

20 Claims, 15 Drawing Sheets

(56) References Cited

U.S. PATENT DOCUMENTS

| | | |
|---|---|---|
| 9,679,489 B2 | 6/2017 | Lambert et al. |
| 9,769,616 B1 | 9/2017 | Pao et al. |
| 9,894,484 B1 | 2/2018 | Pao et al. |
| 10,091,618 B1 | 10/2018 | Pao et al. |
| 10,285,014 B2 | 5/2019 | Pao et al. |
| 10,349,223 B1 | 7/2019 | Yoo et al. |
| 10,467,554 B2 | 11/2019 | Yoo et al. |
| 10,489,738 B2 | 11/2019 | Clark et al. |
| 2004/0260470 A1 | 12/2004 | Rast |
| 2005/0015307 A1 | 1/2005 | Simpson et al. |
| 2006/0241862 A1* | 10/2006 | Ichihara ............... G01C 21/343 |
| | | 701/533 |
| 2009/0216600 A1 | 8/2009 | Hill |
| 2010/0057502 A1 | 3/2010 | Arguelles et al. |
| 2010/0207812 A1 | 8/2010 | Demirdjian et al. |
| 2011/0099040 A1 | 4/2011 | Felt et al. |
| 2011/0225269 A1 | 9/2011 | Yap et al. |
| 2011/0301985 A1 | 12/2011 | Camp et al. |
| 2011/0313880 A1 | 12/2011 | Paul et al. |
| 2012/0232943 A1 | 9/2012 | Myr |
| 2012/0265433 A1 | 10/2012 | Viola et al. |
| 2012/0290652 A1 | 11/2012 | Boskovic |
| 2013/0132140 A1 | 5/2013 | Amin et al. |
| 2013/0179205 A1 | 7/2013 | Slinin |
| 2013/0246301 A1 | 9/2013 | Radhakrishnan et al. |
| 2014/0047381 A1 | 2/2014 | Fan et al. |
| 2014/0062886 A1 | 3/2014 | Pasquero et al. |
| 2014/0129135 A1 | 5/2014 | Holden et al. |
| 2014/0129302 A1 | 5/2014 | Amin et al. |
| 2014/0171039 A1 | 6/2014 | Bjontegard |
| 2014/0188775 A1 | 7/2014 | Lehmann et al. |
| 2014/0188920 A1 | 7/2014 | Sharma et al. |
| 2015/0161554 A1 | 6/2015 | Sweeney et al. |
| 2015/0161564 A1 | 6/2015 | Sweeney et al. |
| 2015/0161697 A1 | 6/2015 | Jones et al. |
| 2015/0271290 A1 | 9/2015 | Tao et al. |
| 2016/0027306 A1 | 1/2016 | Lambert et al. |
| 2016/0298977 A1 | 10/2016 | Newlin et al. |
| 2017/0169535 A1 | 6/2017 | Tolkin et al. |
| 2017/0193404 A1 | 7/2017 | Yoo et al. |
| 2017/0352125 A1* | 12/2017 | Dicker ................... G06Q 50/30 |
| 2018/0259351 A1 | 9/2018 | Broyles et al. |

FOREIGN PATENT DOCUMENTS

| | | |
|---|---|---|
| WO | WO 2011-069170 A1 | 6/2011 |
| WO | WO 2017-052577 A1 | 3/2017 |
| WO | WO 2017-079287 A1 | 5/2017 |

OTHER PUBLICATIONS

U.S. Appl. No. 13/828,913, Nov. 5, 2015, Office Action.
U.S. Appl. No. 13/828,913, Aug. 25, 2016, Office Action.
U.S. Appl. No. 13/828,913, Apr. 21, 2017, Office Action.
U.S. Appl. No. 13/828,913, Jan. 9, 2018, Office Action.
U.S. Appl. No. 13/828,913, Aug. 27, 2018, Office Action.
U.S. Appl. No. 13/828,913, Jun. 26, 2019, Notice of Allowance.
U.S. Appl. No. 15/479,118, Jun. 28, 2017, Notice of Allowance.
U.S. Appl. No. 15/666,446, Oct. 4, 2017, Notice of Allowance.
U.S. Appl. No. 15/880,396, May 23, 2018, Notice of Allowance.
U.S. Appl. No. 15/842,202, Oct. 30, 2018, Office Action.
U.S. Appl. No. 15/842,202, Feb. 27, 2019, Notice of Allowance.
U.S. Appl. No. 16/148,633, Dec. 21, 2018, Notice of Allowance.
U.S. Appl. No. 16/369,998, Oct. 7, 2019, Notice of Allowance.
U.S. Appl. No. 16/688,859, dated Mar. 2, 2020, Notice of Allowance.

* cited by examiner

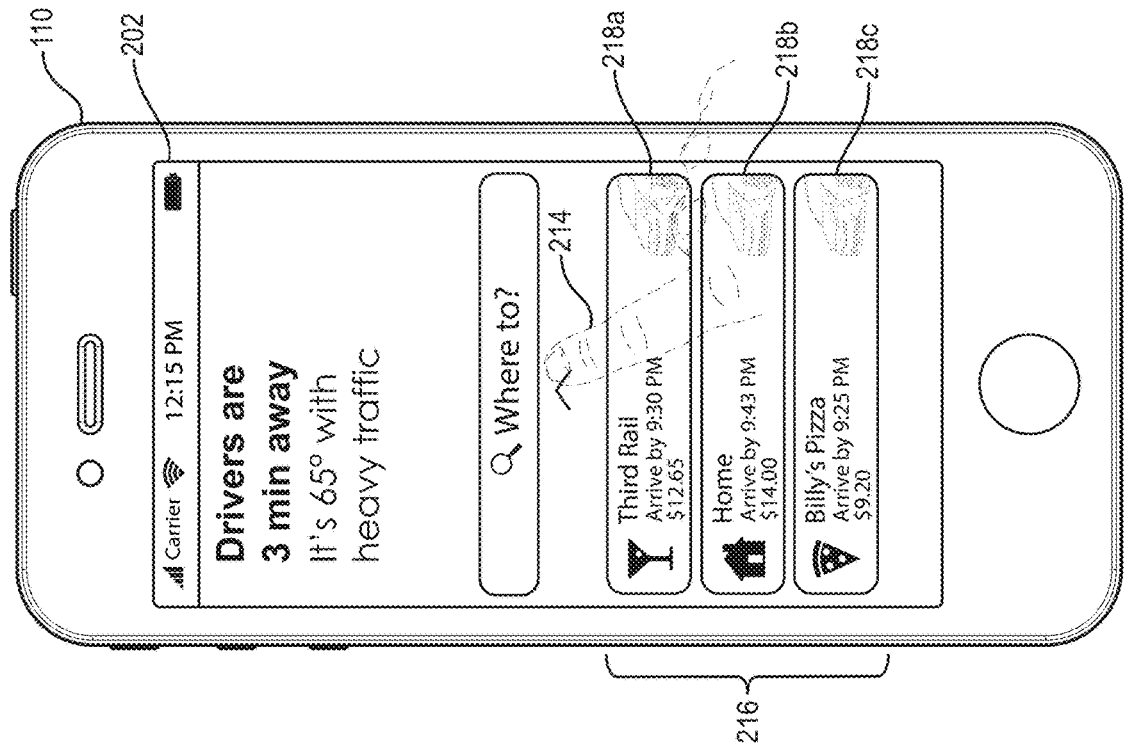
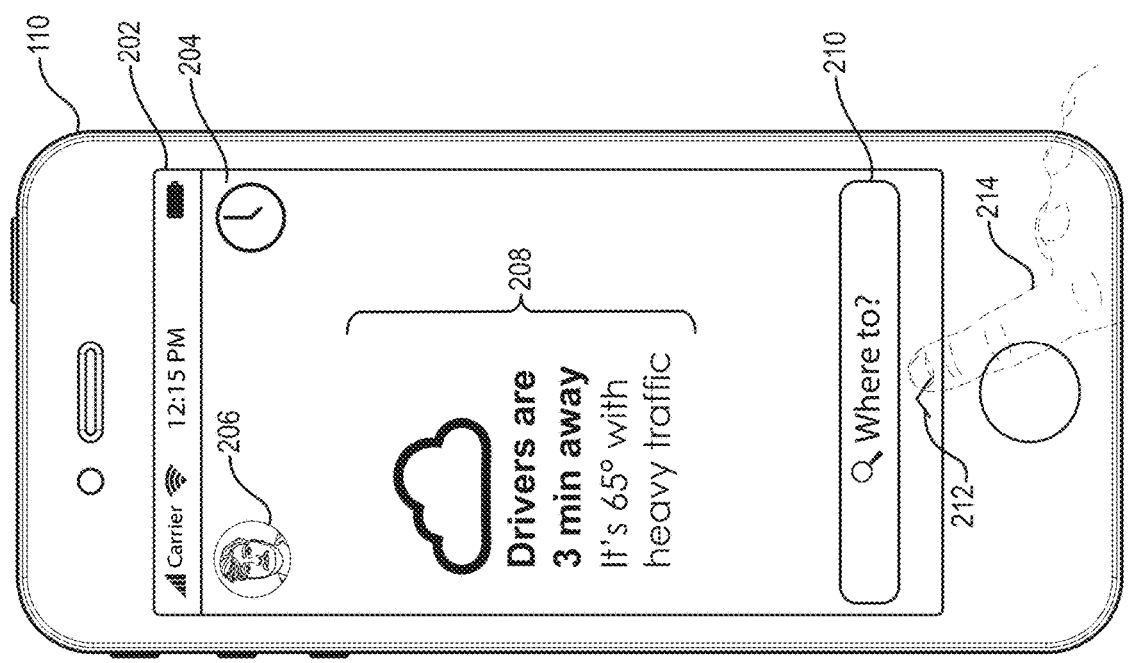
FIG. 3B
FIG. 3A

INITIATING TRANSPORTATION REQUESTS

The present application is a continuation of U.S. patent application Ser. No. 15/842,202, filed Dec. 14, 2017. The aforementioned application is hereby incorporated by reference in their entirety.

BACKGROUND

The use of mobile app-based transportation matching system is becoming increasingly popular. For instance, when users are traveling or are in situations where renting a vehicle or using a user's own vehicle is burdensome, inefficient, or unavailable, users frequently utilize transportation matching systems to get to where they need to go. For example, a user generally makes a transportation request by sending the transportation request including a pickup location, a destination location, and other preferences to a transportation matching system. The transportation matching system then identifies a provider to transport the user from the pickup location to the destination location.

Conventional transportation matching systems and corresponding mobile applications, however, can be inefficient, inflexible, and not user friendly with regard to initiating transportation requests. For example, conventional systems typically require multiple selections and inputs via one or more graphical user interfaces in order to configure a transportation request. Specifically, a user may have to manually input account login information, a pickup address, a destination address, and other user preferences (e.g., provider preference, car size preference, music preference). Thus, when using convention systems, a user may be standing on a street corner for several minutes—sometimes in unfavorable conditions—inputting information prior to actually sending a transportation request.

Accordingly, a need exists for faster and more effective ways for users to configure and initiate transportation requests to a transportation matching system.

BRIEF DESCRIPTION OF THE DRAWINGS

The detailed description refers to the drawings briefly described below.

FIGS. 3A-3E illustrate a series of graphical user interfaces that the transportation matching system provides in order to enable the sending of a transportation request in response to a single vertical swipe touch gesture in accordance with one or more embodiments;

DETAILED DESCRIPTION

Figure 1:
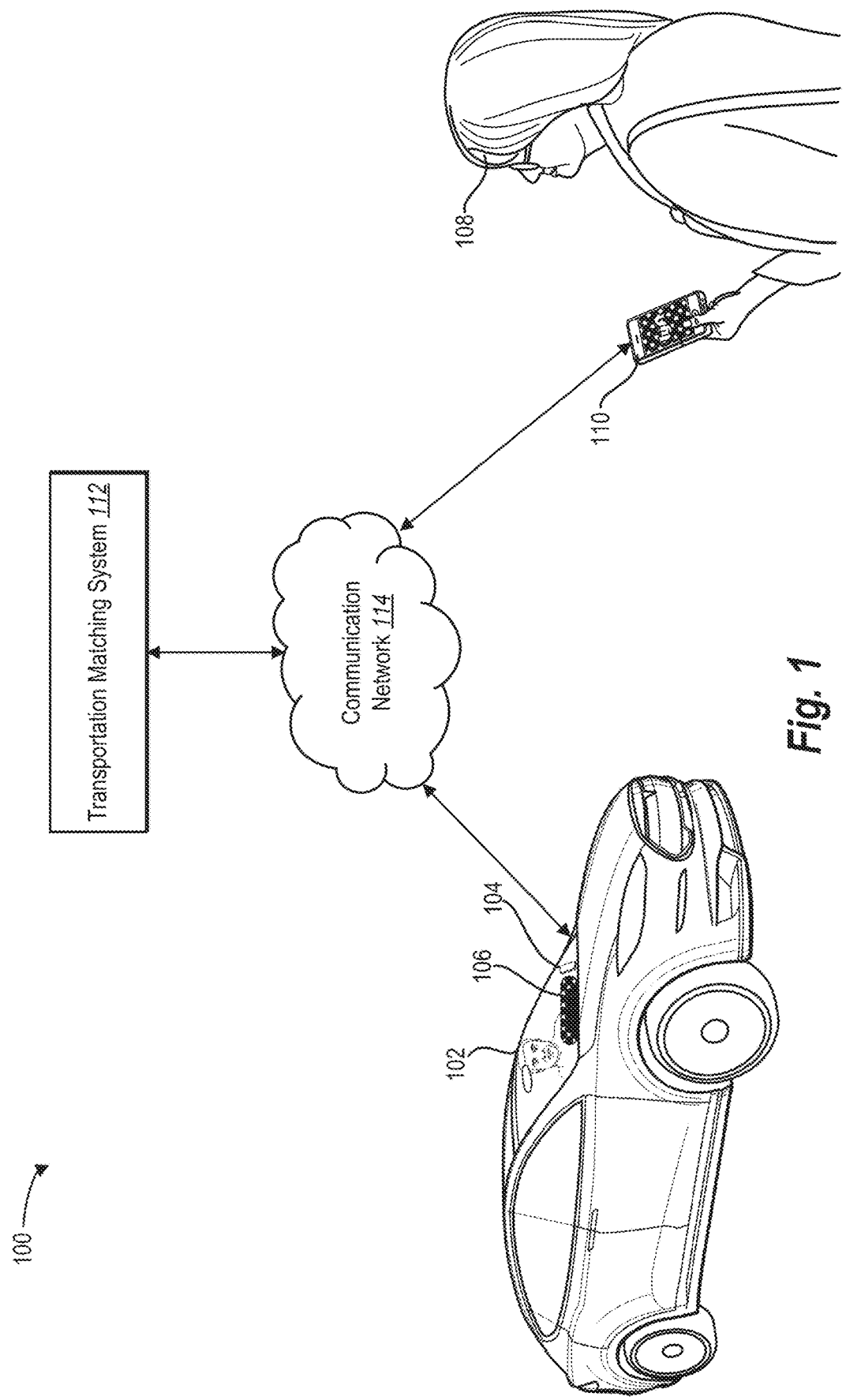
FIG. 1 illustrates an environmental diagram of a transportation matching system in accordance with one or more embodiments.

One or more embodiments described herein provide benefits and/or solve one or more of the foregoing or other problems in the art with systems and methods that generate and send a transportation request to a transportation matching system in response to a single user interaction on a requestor computing device. For example, in one or more embodiments, the transportation matching system identifies a pattern of requests in the request history associated with a requestor and predicts one or more destinations options based on the current location and time associated with the requestor computing device. Additionally, the transportation matching system can identify additional destination options based on monitored application activity information, social media activity information, and nearby events. In one or more embodiments, the transportation matching system scores and ranks the identified destination options according to how closely each destination option correlates with a request matching pattern associated with the requestor computing device, and provides an ordered list of the top destinations options.

In one or more embodiments, the transportation matching system provides a list of destination options via a requestor computing device. For example, the transportation matching system can provide the list of destination options as part of an initial transportation request graphical user interface displayed on the requestor computing device in response to the initialization of a transportation matching system application. In response to detecting a single user interaction (e.g., a horizontal swipe touch gesture) in connection with a destination option in the list of destination options, the requestor computing device automatically generates and sends a transportation request associated with the destination option to the transportation matching system. In at least one embodiment, the transportation matching system then matches the automatically generated transportation request to a provider and provides confirmation information to the requestor computing device via the transportation matching system application.

In addition to saving a user time and hassle, the transportation matching system also creates additional technical efficiencies over conventional systems. For example, by providing the user with a list of pre-determined destination options, the transportation matching system does not require additional processing resources to standardize and error-check user-provided input (e.g., run spell-check, confirm a vague or ambiguous destination address). Additionally, the transportation matching system makes more efficient use of the limited display space typically available on a handheld computing device, such as a smart phone or other smart wearable. For example, the transportation matching system does not require multiple graphical user interfaces cluttered with input boxes, drop-down menus, and other displayed elements typically necessary to facilitate the manual input of request information (e.g., pickup location, destination location, transportation preferences). Instead, the transportation matching system provides an uncluttered and simple display with which a user can easily interact.

As used herein, a "transportation request" (or "request") refers to a collection of data sent to a transportation matching system that, in turn, allows the transportation matching system to match the transportation request to at least one provider computing device. For example, the transportation matching system described herein matches a transportation request to a particular provider computing device based on the provider computing device's current proximity to the requestor computing device where the transportation request originated, as well as on other factors such as the destination specified in the transportation request, provider ratings, and so forth.

As used herein, a "requestor" refers to a transportation matching system user (e.g., a rider) who utilizes a requestor computing device to send a transportation request to the transportation matching system. In one or more embodiments, the requestor computing device is a handheld computing device such as a smart phone or smart wearable that includes a transportation matching system application, as will be described in greater detail below.

As used herein, a "provider" refers to a transportation matching system user (e.g., a driver) who drives a vehicle in order to transport requestors. Alternatively, in at least one embodiment, the provider refers to an autonomous vehicle that is integrated with the transportation matching system. In one or more embodiments, the provider utilizes a provider computing device that is a handheld computing device such as a smart phone. In at least one embodiment, the provider computing device includes a transportation matching system application, similar to the requestor computing device. In one or more embodiments, however, the transportation matching system application makes different options and features available on the provider computing device than it does on the requestor computing device.

As used herein, the "transportation matching system" refers to a central service that matches a request from a requestor computing device to a provider computing device to facilitate completion of the transportation request. For example, in one or more embodiments, the transportation matching system receives a transportation request including a pickup location and a destination location and matches the request to a provider computing device that is within a threshold distance of the pickup location. In at least one embodiment, the transportation matching system takes additional factors (e.g., requestor preferences) into account when matching a request.

In one or more embodiments, as will be described in greater detail below, the transportation matching system generates a request matching pattern associated with a requestor computing device. As used herein, a "request matching pattern" refers to a pattern of requests made by the requestor computing device that represents a pattern of travel in which the requestor engages. The request matching pattern can include one or more entries, where each entry includes a time (e.g., "Thursdays at 6 pm), a pickup location (e.g., "the Wells Fargo building downtown"), a destination location (e.g., "1234 Anystreet"), and an indication of how many times or the frequency with which this request has been made (e.g., "requested 20 times, once a week"). In at least one embodiment, the request matching pattern associated with the requestor computing device is different from a request matching history associated with the requestor computing device in that the request matching history includes each and every request that the requestor computing device has made, while the request matching pattern includes the requests made by the requestor computing device that fall into a particular pattern. In other words, in one or more embodiments, the request matching pattern includes requests that the requestor computing device makes regularly (e.g., every day at the same time, every week on the same day), while the request matching history also includes various outlier requests that the requestor computing device makes only once or sporadically.

FIG. 1 illustrates an example environment 100 for the transportation matching system 112 including a provider 102 associated with a provider computing device 104 and a provider communication device 106 (e.g., an apparatus displayed in a provider car window), as well as a requestor 108 associated with a requestor computing device 110. As further shown in FIG. 1, the provider computing device 104 and the requestor computing device 110 communicate with a transportation matching system 112 via a communication network 114. In one or more embodiments, the communication network 114 may include one or more networks and may use one or more communication platforms or technologies suitable for transmitting data and/or communication signals. In one or more embodiments, the communication network 114 includes a cellular network. Alternatively, the communication network 114 can include the Internet or World Wide Web. Additionally or alternatively, the communication network 114 can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

To illustrate, the requestor computing device 110 sends a transportation request to the transportation matching system 112. As discussed above, a "transportation request" refers to information provided by a transportation matching system application installed on the requestor computing device 110 and utilized by the transportation matching system 112 to identify a provider to fulfill the request. For example, the information that makes up a request can include, but is not limited to, a current location of the requestor computing device 110, a specified pickup location (e.g., if different than the current location of the requestor computing device 110), a current time associated with the requestor computing device 110, a specific request time (e.g., if requesting a future transport), a specified destination location, a transportation matching system account identifier associated with the requestor computing device 110, and other preferences associated with the requestor computing device 110 (e.g., highways vs. side-streets, temperature, music, pet friendly, child seat, wheelchair accessible).

In one or more embodiments, the transportation matching system 112 receives a transportation request from the transportation matching system application installed on the requestor computing device 110 and utilizes the information provided as part of the transportation request to match the transportation request to a provider computing device 104. For example, the transportation matching system 112 matches a transportation request to a provider computing device 104 based on: proximity of the provider computing device 104 to a specified pickup time and location, driver ratings and preferences, and the specified destination location in the transportation request. After identifying a match, the transportation matching system 112 requests a confirmation from the matched provider computing device 104. In response to receiving a confirmation, the transportation matching system 112 provides a communication via the transportation matching system application on the requestor computing device 110 stating that a provider (e.g., the provider 102) is coming to fulfill the transportation request.

Figure 2B:
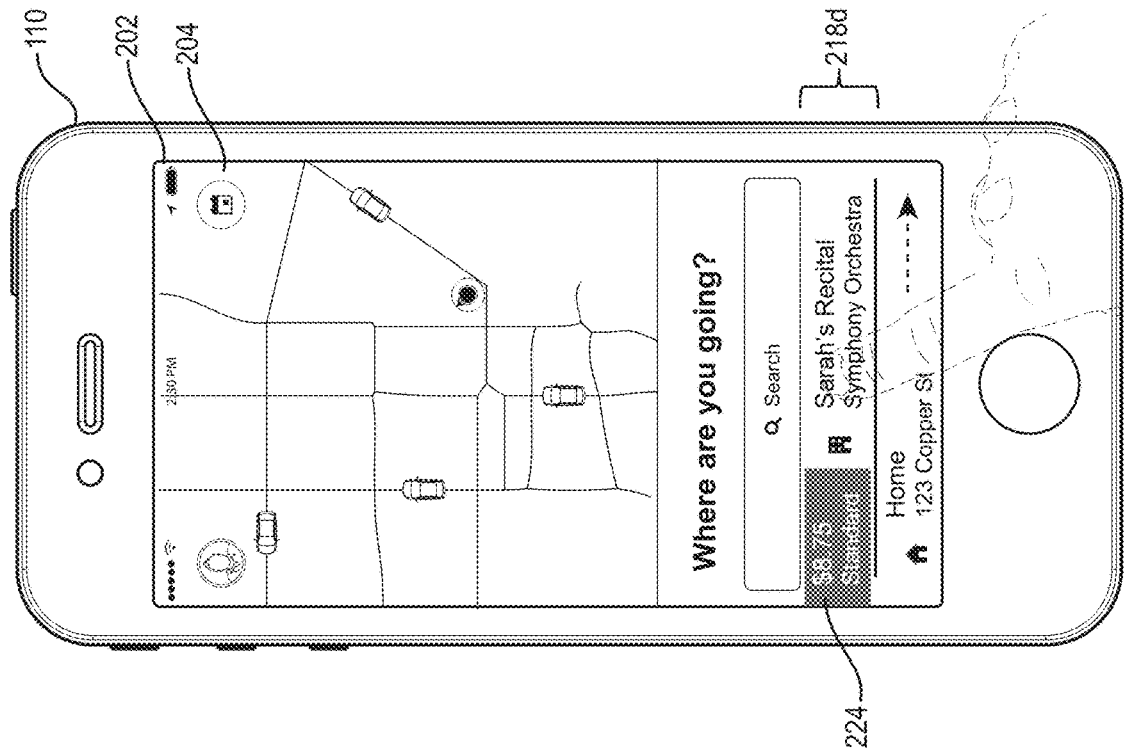
FIGS. 2A-2D illustrate a series of graphical user interfaces that the transportation matching system provides in order to enable the sending of a transportation request in response to a single horizontal swipe touch gesture in accordance with one or more embodiments.
Figure 2A:
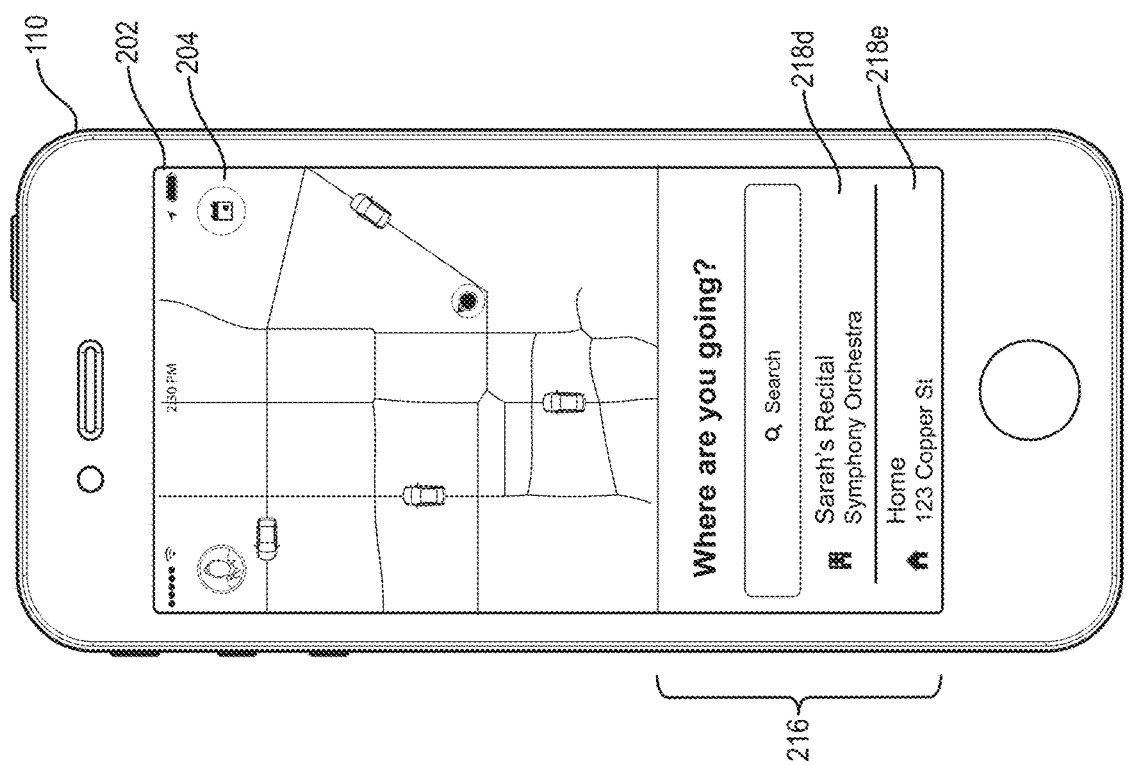

As mentioned above, the transportation matching system 112 enables the requestor computing device 110 to send a transportation request to the transportation matching system 112 in response to a single user interaction. FIGS. 2A-2D illustrate a series of graphical user interfaces by which the requestor computing device 110 detects the single user interaction. For example, as shown in FIG. 2A, the transportation matching system 112 provides a transportation request graphical user interface 204 on a touch screen display 202 of the requestor computing device 110.

As further shown in FIG. 2A, the transportation matching system 112 can provide the list 216 of destination options 218*d*, 218*e* in response to the initialization of a transportation matching system application installed on the requestor computing device 110. For example, the transportation matching system 112 (e.g., via the transportation matching system application installed on the requestor computing device 110) can provide the transportation request graphical user interface 204 including the list 216 of destination options 218*d*, 218*e* as a "home screen" that the user of the requestor computing device 110 sees upon first opening the transportation matching system application (e.g., by initializing the application or switching display focus to the application). In at least one embodiment, the transportation matching system 112 predicts the destination options 218*d* and 218*e* based on the current location and time associated with the requestor computing device 110, and an analysis of a request history associated with the requestor computing device 110. The process by which the transportation matching system 112 identifies and provides the destination options 218*d*, 218*e* is described in greater detail below with reference to FIGS. 5A-6.

The transportation matching system 112 can automatically generate and send a transportation request in response to a single detected user interaction in connection with one of the destination options in the list 216. For example, as shown in FIG. 2B, the transportation matching system 112 can detect a horizontal swipe touch gesture in connection with the destination option 218*d*. In response to detecting the horizontal swipe touch gesture meets a first threshold in relation to the destination option 218*d*, the transportation matching system 112 can estimate a cost associated with a transportation request to the destination indicated by the destination option 218*d*. For instance, the transportation matching system 112 can estimate the cost of the transportation request in response to detecting that the horizontal swipe touch gesture moves beyond a first portion (e.g., the first one-third) of the destination option 218*d*. In one or more embodiments, the transportation matching system 112 estimates the cost based on historical information, the distance between the pickup location and the destination indicated by the destination option 218*d*, the time of day, and current traffic conditions.

As shown in FIG. 2B, in response to detecting the horizontal swipe touch gesture moving beyond the first portion of the destination option 218*d*, the transportation matching system 112 provides the cost indicator 224 including a cost (e.g., "$8.75") and classification (e.g., "Standard") of the ride associated with the destination option 218*d*. In one or more embodiments, the transportation matching system 112 provides the cost indicator 224 as part of the destination option 218*d* such that it appears the cost indicator 224 slides out from the side of the transportation request graphical user interface in connection with the detected horizontal swipe gesture. Furthermore, as shown in FIG. 2B, the transportation matching system 112 can slide the location information (e.g., "Sarah's Recital," "Symphony Orchestra") listed as part of the destination option 218*d* to the side in connection with the detected horizontal swipe gesture. Thus, as the transportation matching system 112 (e.g., by way of the transportation matching application) detects the horizontal swipe gesture, the transportation matching system 112 updates the destination option 218*d* such that the location information and the cost indicator 224 are both visible at the same time within the transportation request graphical user interface 204.

Figure 2D:
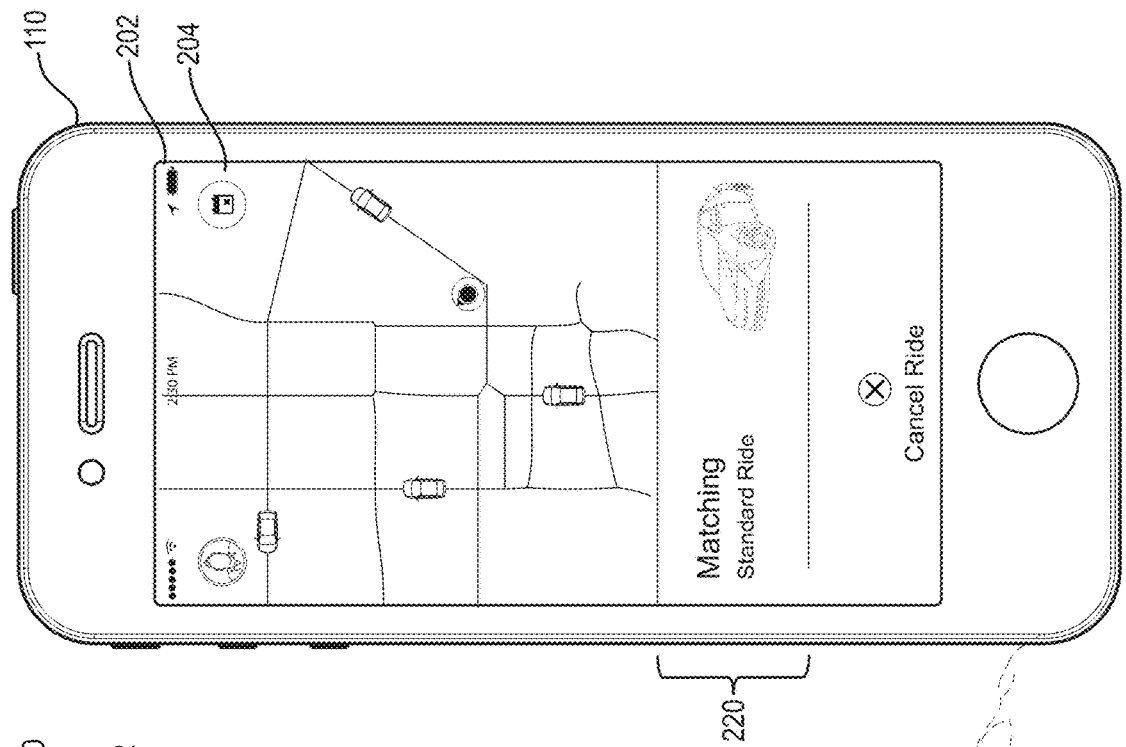
Figure 2C:
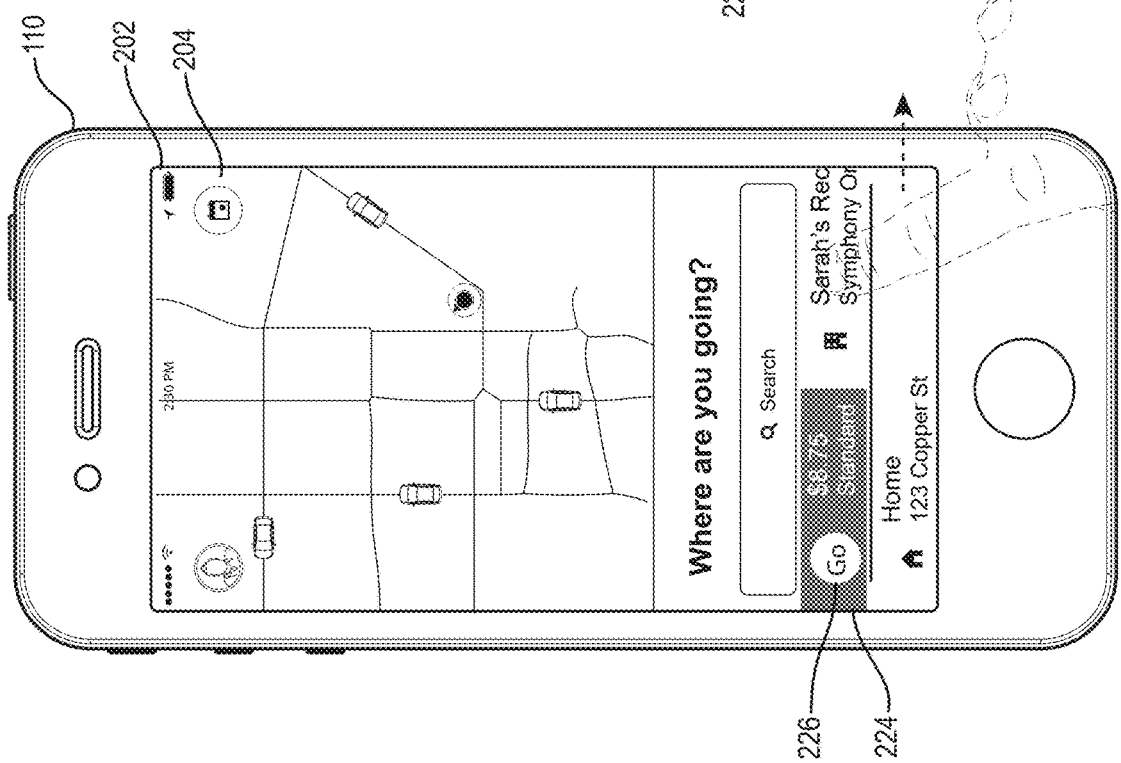

The transportation matching system 112 further generates a transportation request in response to determining that the detected user interaction with the destination option 218*d* meets a second threshold. For example, as shown in FIG. 2C, the transportation matching system 112 detects the horizontal swipe touch gesture move beyond a second threshold (e.g., the first half of the destination option 218*d*). In response to detecting the horizontal swipe touch gesture move beyond the second threshold, the transportation matching system 112 generates the transportation request associated with the destination option 218*d* and updates the cost indicator 224 to include the confirmation icon 226. In one or more embodiment, the transportation matching system 112 provides the confirmation icon 226 to indicate to the requestor that the transportation request associated with the destination option 218*d* has been generated and sent. The process by which the transportation matching system 112 generates and sends a transportation request is described in greater detail below with reference to FIGS. 5A-6.

As another illustrative example, in one embodiment, the transportation matching system 112 estimates the cost associated with each destination option in the list 216 in response to the initialization of the transportation matching system application installed on the requestor computing device 110. The transportation matching system 112 can then provide the cost indicator 224 showing the estimated cost associated with the destination option 218*d* in response to the horizontal swipe touch gesture (e.g., in response to the swipe gesture moving beyond approximately fifteen percent of the width of the transportation request graphical user interface 204 from the left side of the transportation request graphical user interface 204). In one or more embodiments, as the horizontal swipe touch gesture continues to move across the transportation request graphical user interface 204 (e.g., beyond approximately forty-five percent of the width of the transportation request graphical user interface 204), the requestor computing device 110 can generate and send a transportation request associated with the destination option 218*d* to the transportation matching system 112.

In at least one embodiment, the transportation matching system 112 confirms the transportation request when the horizontal swipe touch gesture is released. For example, as shown in FIG. 2D, in response to detecting the release of the horizontal swipe touch gesture, the transportation matching system 112 provides the request confirmation 220. In one or more embodiments, the transportation matching system 112 updates the request confirmation 220 with information related to the status of the request. For example, the transportation matching system 112 initially includes a statement that the request is being matched (e.g., "Matching." After matching the request, the transportation matching system 112 can update the request confirmation 220 to inform the requestor that a provider is on the way.

Although the embodiment described in FIGS. 2A-2D includes the transportation matching system 112 detecting a horizontal swipe touch gesture that meets various thresholds, the transportation matching system 112 can detect other types of user interactions that meet thresholds. For example, in an alternative embodiment, the transportation matching system 112 can detect a variable pressure touch gesture in connection with the destination option 218d. In that embodiment, the transportation matching system 112 can determine that the variable pressure touch gesture meets the first threshold when the touch pressure of the touch gesture exceeds a first amount. The transportation matching system 112 can then determine that the same touch gesture meets the second threshold when the touch pressure of the touch gesture increases and exceeds a second amount.

In yet another embodiment, the transportation matching system 112 (e.g., by way of the transportation matching application running on the requestor computing device 110) can detect a press-and-hold touch gesture in connection with the destination option 218d. In that embodiment, the transportation matching system 112 can determine that the press-and-hold touch gesture meets a first threshold when the amount of hold-time that the press-and-hold touch gesture has been held exceeds a first threshold amount of time (e.g., one second). The transportation matching system 112 can then determine that the same press-and-hold touch gesture meets the second threshold when the amount of hold-time the same press-and-hold touch gesture has been held exceeds a second threshold amount of time (e.g., three seconds).

As discussed above with reference to FIGS. 2A-2D, the transportation matching system 112 generates and sends a transportation request in response to detecting a single horizontal swipe touch gesture. In additional embodiments, the transportation matching system 112 can generate and send a transportation request in response to detecting other types of user interactions. For example, as shown in FIG. 3A, the transportation matching system 112 can provide the transportation request graphical user interface 204 including a user profile picture 206 and general information 208 upon initialization of the transportation matching system application installed on the requestor computing device 110. In at least one embodiment, the transportation matching system 112 provides the user profile picture 206 to indicate that the transportation matching system application installed on the requestor computing device 110 is properly logged in to a user account (e.g., an account associated with the user of the requestor computing device 110). Additionally, in one or more embodiments, the transportation matching system 112 provides the general information 208 to inform the user of the requestor computing device 110 of current weather and traffic conditions, general expected wait times, and other pertinent information (e.g., nearby events, upcoming appointments).

As further illustrated in FIG. 3A, the transportation request graphical user interface 204 includes a destination configuration button 210. In one or more embodiments, in response to detecting a selection of the destination configuration button 210, the transportation matching system 112 provides a series of graphical user interfaces including various input elements (e.g., text boxes, radio buttons, interactive maps) that enable a user to manually input request information. For example, the transportation matching system 112 can provide various input elements that enable the user to specify a pickup location, a destination, and other preferences. As discussed above, the process of manually inputting request information in this manner is time consuming, frustrating, and often leaves a user standing on the street in potentially unsafe conditions.

Accordingly, as shown in FIG. 3A, the transportation matching system 112 includes the swipe-up indicator 212 in the transportation request graphical user interface 204. In response to detecting the finger 214 perform a swipe-up touch gesture in connection with the swipe-up indicator 212 on the touch screen display 202 of the requestor computing device 110, the transportation matching system 112 provides a list 216 of destination options 218a, 218b, and 218c as part of the transportation request graphical user interface 204, as illustrated in FIG. 2B. In one or more embodiments, although the transportation matching system 112 provides the list 216 in response to detecting a swipe-up touch gesture in connection with the swipe-up indicator 212, the transportation matching system 112 generates the list 216 in response to the detected initialization of the transportation matching system application on the requestor computing device 110.

For example, in one or more embodiments, the transportation matching system 112 generates the list 216 by predicting one or more destination options (e.g., the destination options 218a, 218b, and 218c) for the requestor computing device 110. In at least one embodiment, the transportation matching system 112 predicts the destination options 218a, 218b, and 218c based on the current location and time associated with the requestor computing device 110, and an analysis of a request history associated with the requestor computing device 110. For instance, the transportation matching system 112 can analyze the request history associated with the requestor computing device 110 to identify a request matching pattern associated with the requestor computing device 110. In at least one embodiment, the transportation matching system 112 utilizes this pattern, in light of the current location and time associated with the requestor computing device 110, to identify the one or more destination options. Additionally, in at least one embodiment, the transportation matching system 112 identifies the one or more destination options based on nearby events, additional application activity information (e.g., calendar application activity, messaging application activity), and social media activity information associated the requestor computing device 110. The process by which the transportation matching system 112 predicts the destination options 218a, 218b, and 218c is described in further detail below with reference to FIGS. 5A-6.

Returning to FIG. 3B, the transportation matching system 112 provides a top number of destination options (e.g., the destination options 218a, 218b, and 218c) in the list 216. In one or more embodiments, the transportation matching system 112 determines the top number of destination options based on a calculated score associated with each destination option (e.g., all destination options with scores above a threshold number are provided). Alternatively, the transportation matching system 112 may simply provide the three highest scoring destination options in the list 216. Alternatively, the transportation matching system 112 may provide a number of highest scoring destination options that depends on the size of the touch screen display 202. For example, in an embodiment where the requestor computing device 110 is a smart wearable (e.g., a smart watch) with a very limited touch screen display, the transportation matching system 112 may only provide a single destination option that has the highest score. Conversely, in an embodiment where the requestor computing device 110 is a "phablet" (e.g., a tablet-sized smart phone) with a large touch screen display, the transportation matching system 112 may provide five of the highest scoring destination options in the ordered list 216.

As shown in FIG. 3B, each of the destination options 218a-218c include additional information associated with each destination. For example, each destination option 218a-218c includes an estimated arrival time and associated cost. In additional or alternative embodiments, each destination option 218a-218c can include different or additional information (e.g., an event occurring at a particular destination, a restaurant special at a particular destination, a coupon or discount code associated with a particular destination).

As mentioned above, the transportation matching system 112 provides the list 216 in response to detecting a swipe-up touch gesture by the finger 214 in connection with the swipe-up indicator 212. In alternative embodiments, the transportation matching system 112 can provide the list 216 in response to detecting a different type of touch gesture either in connection with the swipe-up indicator 212 (e.g., a tap touch gesture, a spread-open touch gesture), or in connection with any point in the touch screen display. Alternatively, the transportation matching system 112 can provide the list 216 in response to detecting a different type of user interaction with the requestor computing device 110. For example, the transportation matching system 112 can provide the list 216 in response to detecting a tilt of the requestor computing device 110 past a threshold number of degrees, or in response to a spoken voice command.

Figure 3D:
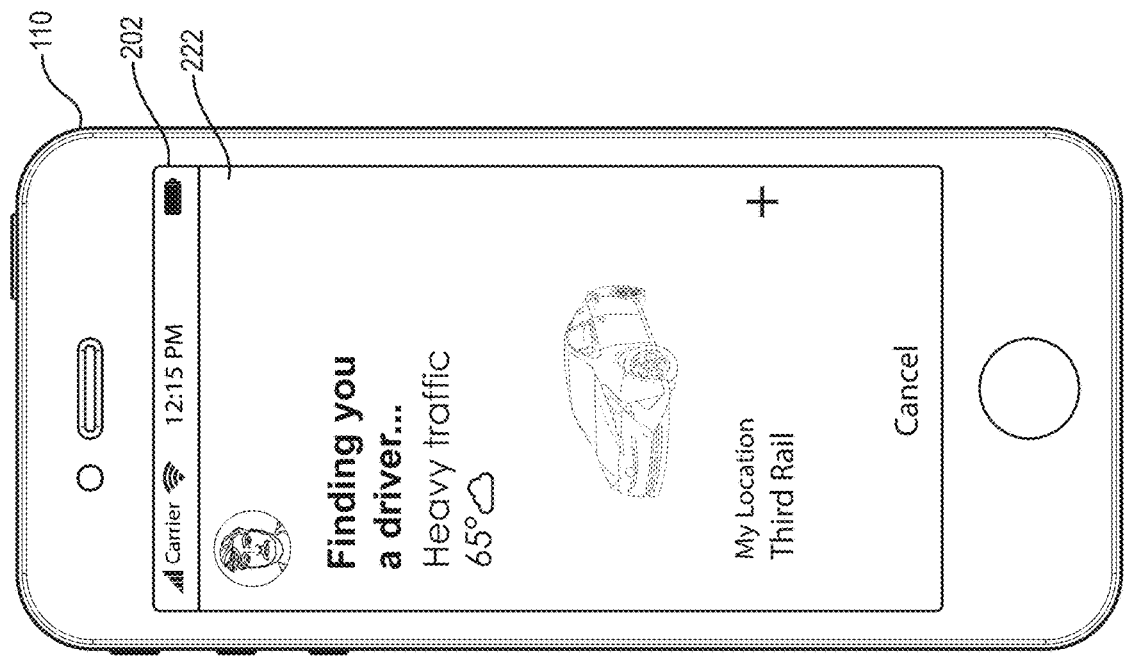
Figure 3C:
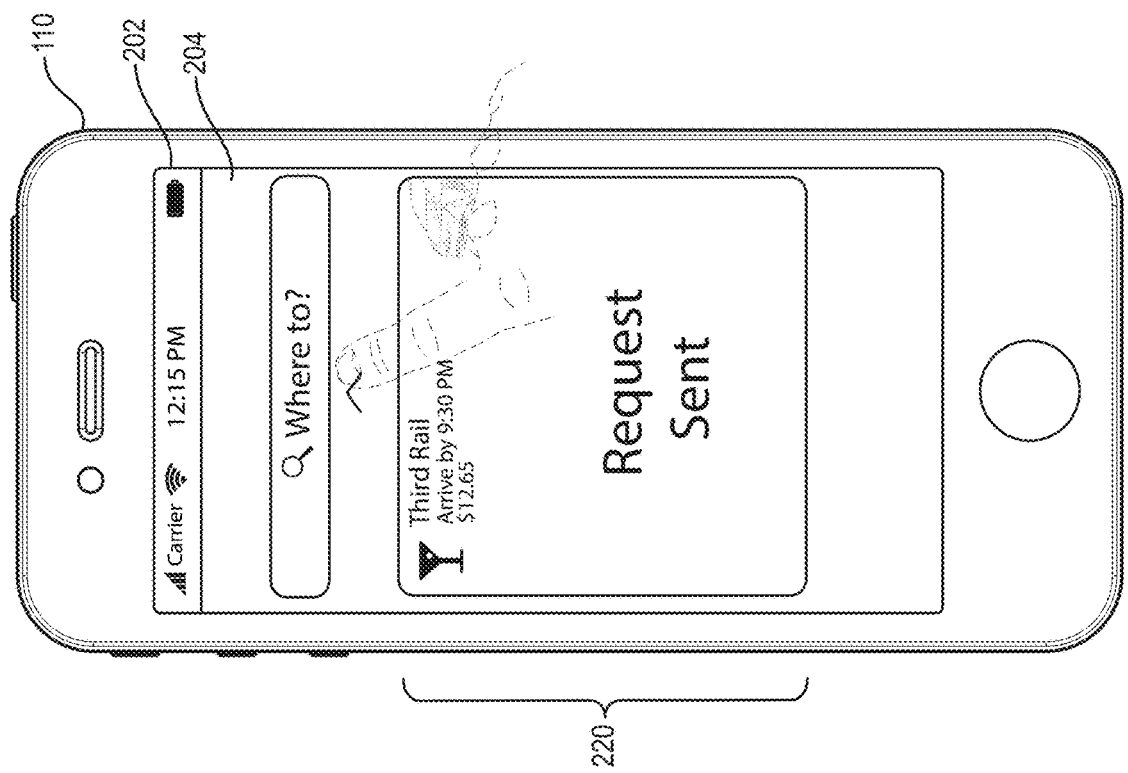

In one or more embodiments, the transportation matching system 112 provides the list 216 of destination options 218a-218c in response to determining the finger 214 swipe-up on the touch screen display 202 beyond a first threshold, as shown in FIG. 3B. Then, in one or more embodiments, the transportation matching system 112 automatically sends a request in response to determining the finger 214 swipe-up on the touch screen display 202 beyond a second threshold, as shown in FIG. 3C. For example, in at least one embodiment, the first threshold is the bottom portion (e.g., a bottom third) of the touch screen display 202, and the second threshold is the middle portion (e.g., a middle third) of the touch screen display 202. Accordingly, in that embodiment, the transportation matching system 112 provides the list 216 in response to determining the swipe-up touch gesture moves beyond the bottom portion of the touch screen display 202, and then automatically sends a request in response to determining the swipe-up touch gesture moves beyond the middle portion of the touch screen display 202.

In additional or alternative embodiments, the transportation matching system 112 can automatically send a request in response to determining additional characteristics associated with a user interaction. For example, in at least one embodiment, the transportation matching system 112 can automatically send a request in response to determining a swipe-up touch gesture is performed with a velocity or speed that exceeds a threshold amount (e.g., a fast swipe-up or flick). In that embodiment, in response to determining that a swipe-up touch gesture is performed slowly (e.g., without the threshold speed or velocity), the transportation matching system 112 may only provide the list 216 without automatically sending a request.

As illustrated in FIG. 3C, in response to determining the swipe-up touch gesture as moved beyond a second threshold (e.g., the middle portion of the touch screen display 202), the transportation matching system 112 (e.g., via the transportation matching system application installed on the requestor computing device 110) automatically generates and sends a request associated with the first destination option (e.g., the destination option 218a) in the list 216, and replaces the list 216 with the request confirmation 220 on the transportation request graphical user interface 204. In one or more embodiments, the request confirmation 220 includes information identifying the destination option that is included in the request (e.g., "Third Rail"), as well as other information associated with the selected destination option. Additionally or alternatively, the request confirmation 220 can include preference information (e.g., pet friendly, child seat, wheel chair accessible) included in account settings associated with the requestor computing device 110.

In one or more embodiments, in response to receiving a request from the requestor computing device 110, the transportation matching system 112 provides a return receipt confirming that the request is being processed. For example, as shown in FIG. 3D, in response to receiving a return receipt, the transportation matching system 112 (e.g., via the transportation matching system application installed on the requestor computing device 110) provides the request update graphical user interface 222 on the touch screen display 202 of the requestor computing device 110. In one or more embodiments, the request update graphical user interface 222 includes information informing the user of the requestor computing device 110 that a driver is being found (e.g., "Finding you a driver..."), that a driver is found and currently on route (e.g., "Your driver is on the way..."), that the driver is nearby (e.g., "Your driver is 30 seconds away..."), and so forth. In one or more embodiments, the user (e.g., the requestor 108) of the requestor computing device 110 may alter or cancel the request from the request update graphical user interface 222.

Figure 3E:
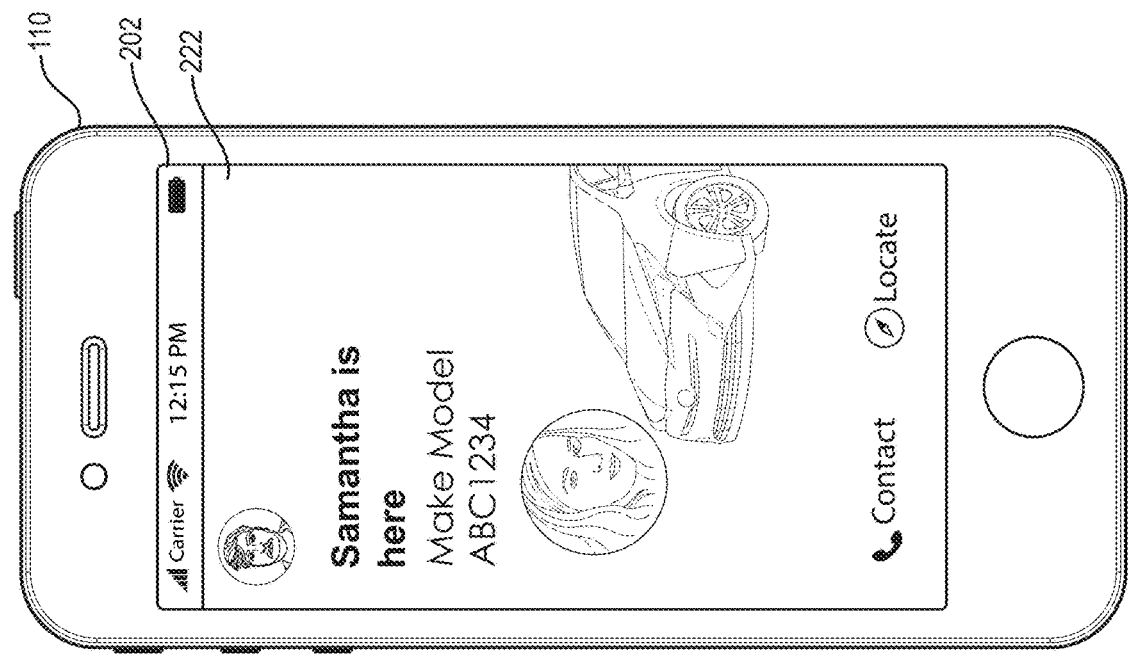

In one or more embodiments, and in response to determining that the requested driver is at the location of the requestor computing device 110, the transportation matching system 112 updates one or more portions of the request update GUI 222. For example, as shown in FIG. 3E, the transportation matching system 112 updates the information provided in the request update GUI 222 to include the name of the matched driver, the make of the matched driver's car, the model of the matched driver's car, the license plate number of the matched driver's car, a profile picture of the matched driver, and a stock image of a car similar to the matched driver's car. Additionally, the transportation matching system 112 can update the request update GUI 222 to include options to contact and/or locate the matched driver.

As described above with reference to FIGS. 2A-3E, the transportation matching system 112 automatically generates and sends a request including a top destination option from the requestor computing device 110 in response to a single detected user interaction. In additional embodiments, the transportation matching system 112 enables the user of the requestor computing device 110 to select a different destination option from the list 216 other than the top destination option. For example, as illustrated in FIG. 4A, the transportation matching system 112 detects a swipe-up touch gesture performed by the finger 214 in connection with the swipe-up indicator 212 in the transportation request graphical user interface 204 on the touch screen display 202 on the requestor computing device 110.

In one or more embodiments, in response to determining that the detected swipe-up touch gesture terminates prior to moving beyond the second threshold, the transportation matching system 112 displays the ordered list 216. For example, as shown in FIG. 4B, in response to detecting the finger 214 release the swipe-up touch gesture prior to the swipe-up touch gesture moving beyond the middle portion of the touch screen display 202, the transportation matching system 112 displays the list 216 in the transportation request graphical user interface 204.

Figure 4B:
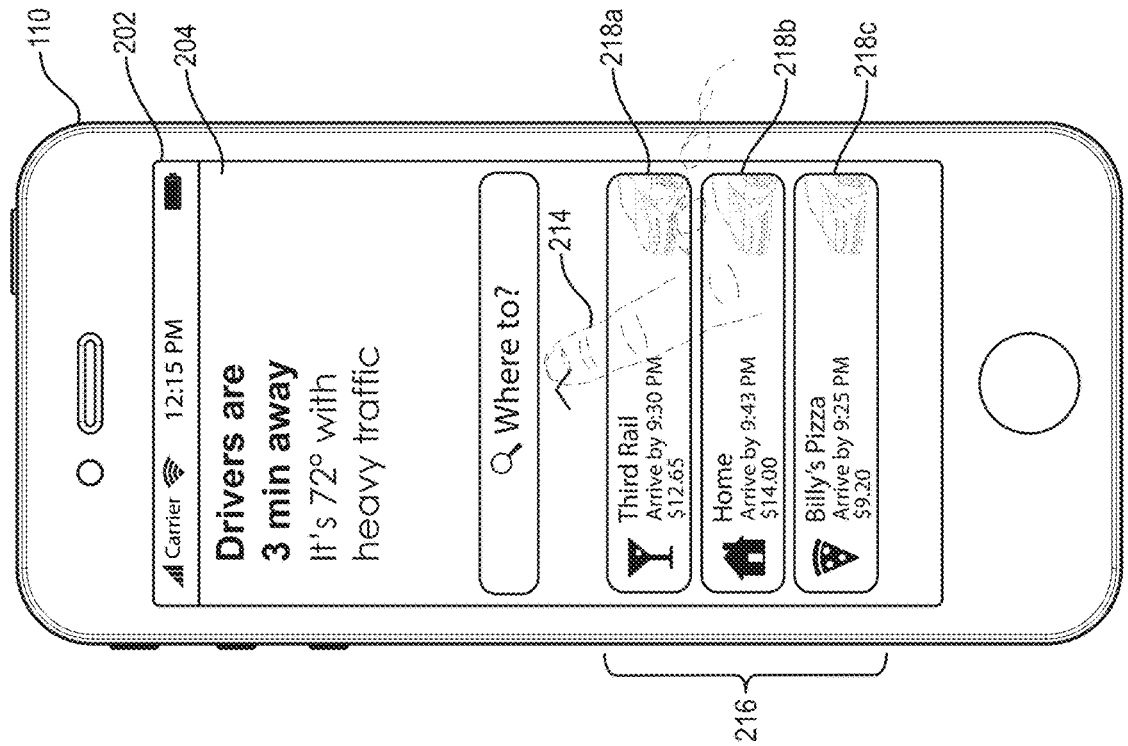
FIGS. 4A-4E illustrate a series of graphical user interfaces that the transportation matching system provides in order to enable the sending of a request in response to more than one user interaction in accordance with one or more embodiments.
Figure 4A:
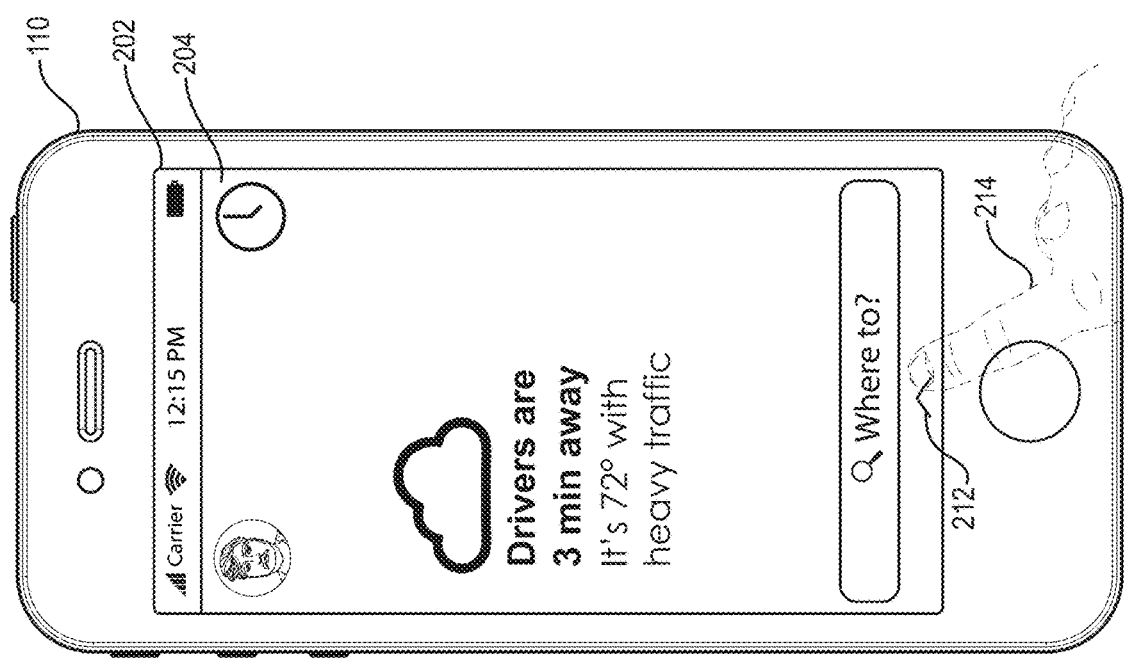

As illustrated in FIG. 4B, the transportation matching system 112 can display the top three destination options (e.g., the destination options 218a-218c) in the ordered list 216 in response to detecting a release of the swipe-up touch gesture prior to the swipe-up touch gesture moving past the middle portion of the touch screen display 202. Alternatively, the transportation matching system 112 may display the list 216 in response to determining the finger 214 performs the swipe-up touch gesture at a speed or velocity below a threshold amount (e.g., performs the swipe-up touch gesture slowly). In that embodiment, the transportation matching system 112 may display a number of destination options in the list 216 that corresponds to a point in the touch screen display 202 where the finger 214 releases the swipe-up touch gestures. For example, if the finger 214 releases the swipe-up touch gesture at the top of the touch screen display 202, the transportation matching system 112 can display more than three top destination options in the ordered list 216. In that example, the ordered list 216 may be scrollable in order for more destination options to be viewable.

Figure 4D:
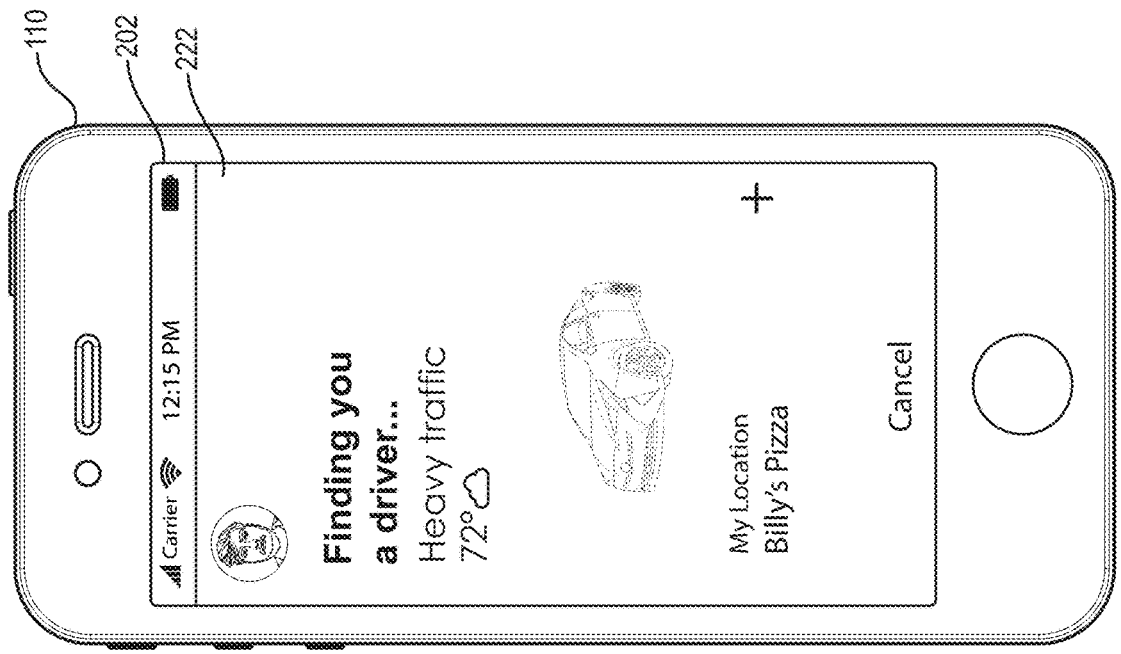
Figure 4C:
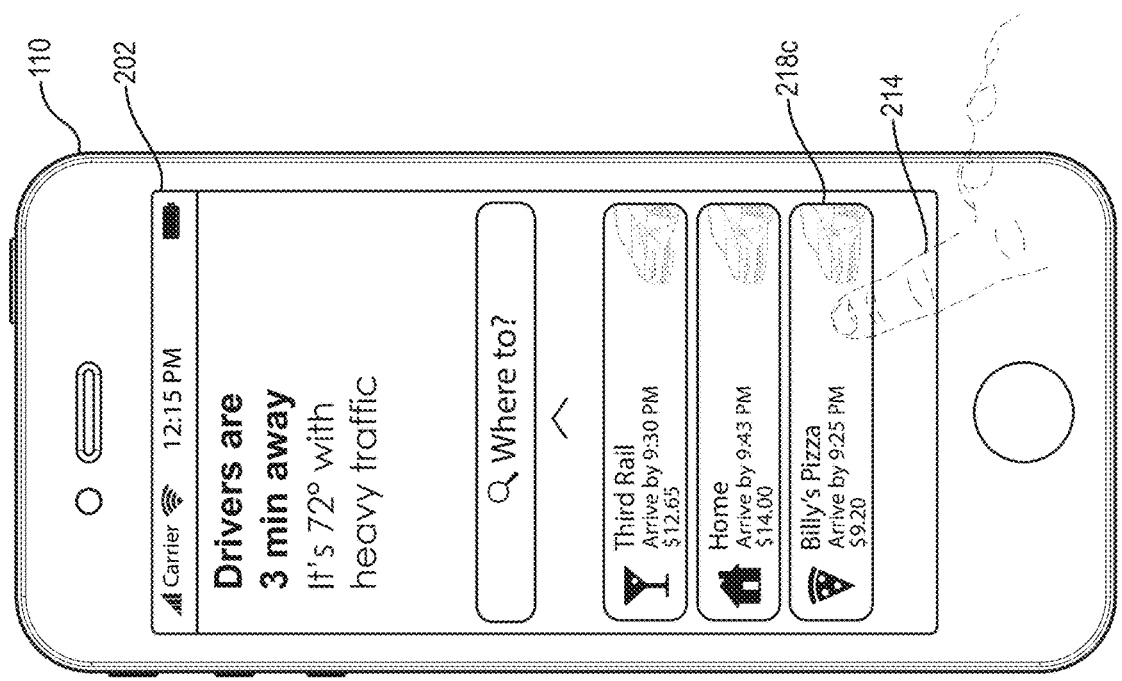

In response to determining the finger 214 has released the swipe-up touch gesture, the transportation matching system 112 displays the list 216 in the touch screen display 202 until detecting a second user interaction with a destination option in the ordered list 216. For example, as shown in FIG. 4C, the transportation matching system 112 detects the finger 214 perform a tap-touch gesture selecting the destination option 218c. In this way, the transportation matching system 112 enables the requestor computing device 110 to send a request for a destination that is not the first destination option listed in the ordered list 216.

In response to detecting a selection of the destination option 218c, the transportation matching system 112 generates and sends a request associated with the selected destination and provides the request update GUI 222 including information about the status of the request. For example, as shown in FIG. 4D, the transportation matching system 112 provides the request update GUI 222 including the status of the request (e.g., "Finding you a driver. . . "), as well as the selected destination (e.g., "Billy's Pizza"), and other information (e.g., "Heavy traffic," "72 degrees").

Figure 4E:
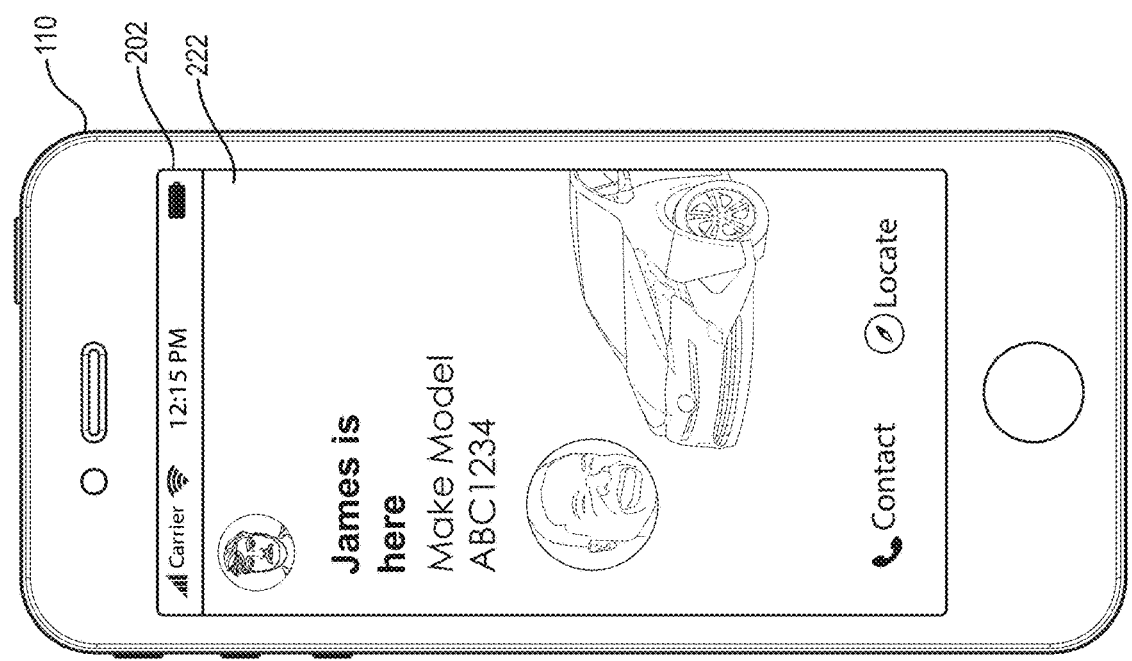

Furthermore, in response to detecting that the driver matched to the request has arrived, the transportation matching system 112 updates the request update GUI 222 to inform the use of the requestor computing device 110. For example, as shown in FIG. 4E, the transportation matching system 112 updates the request update GUI 222 to include a notification that the driver has arrived (e.g., "James is here"), along with the make and model of the driver's car, a profile picture of the driver, and a stock image of the driver's car. Moreover, the transportation matching system 112 also provides options in the request update GUI 222 to contact and/or locate the driver.

Figure 5A:
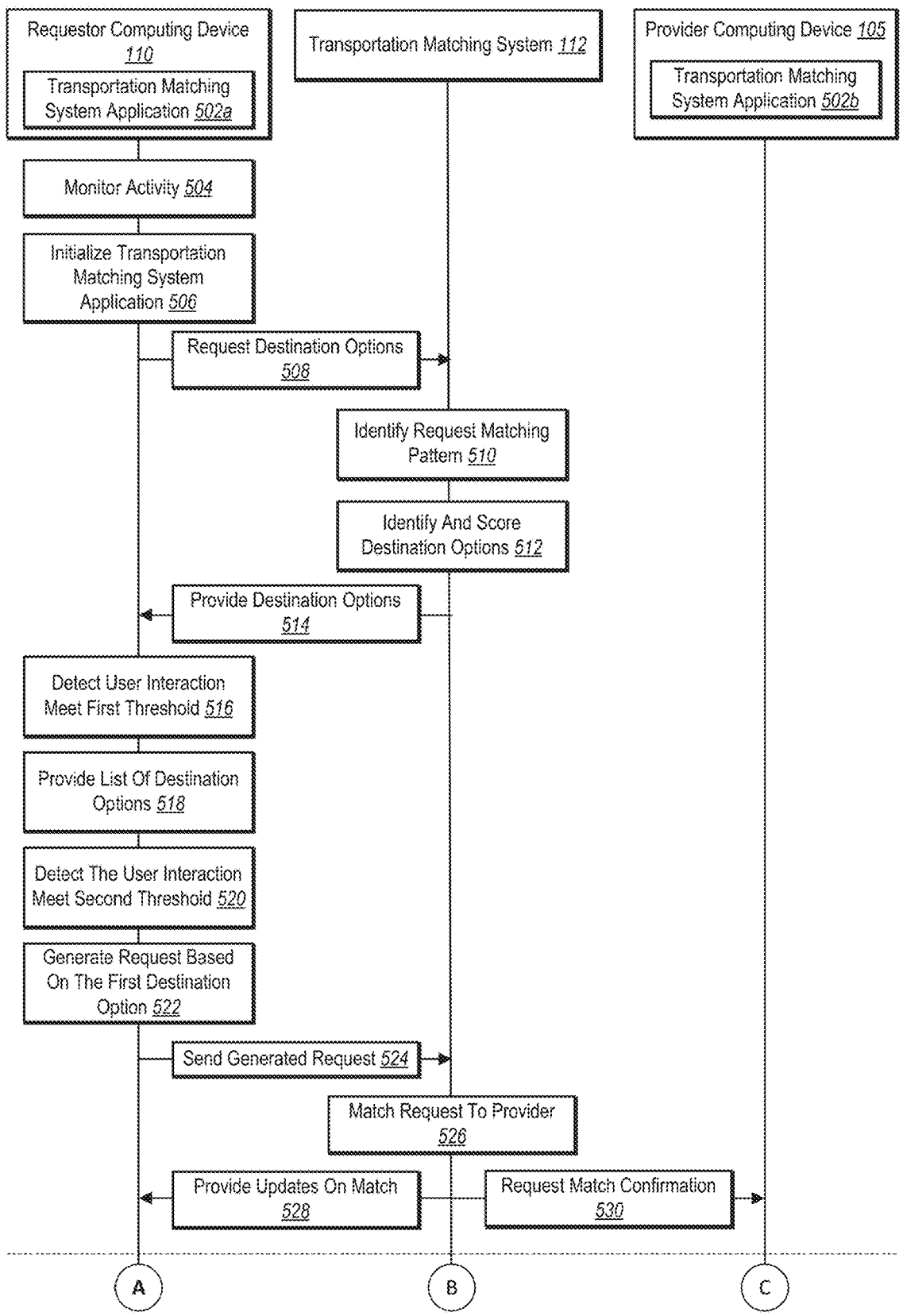
FIGS. 5A-5B illustrate a sequence diagram of a series of acts performed by the transportation matching system in accordance with one or more embodiments.
Figure 5B:
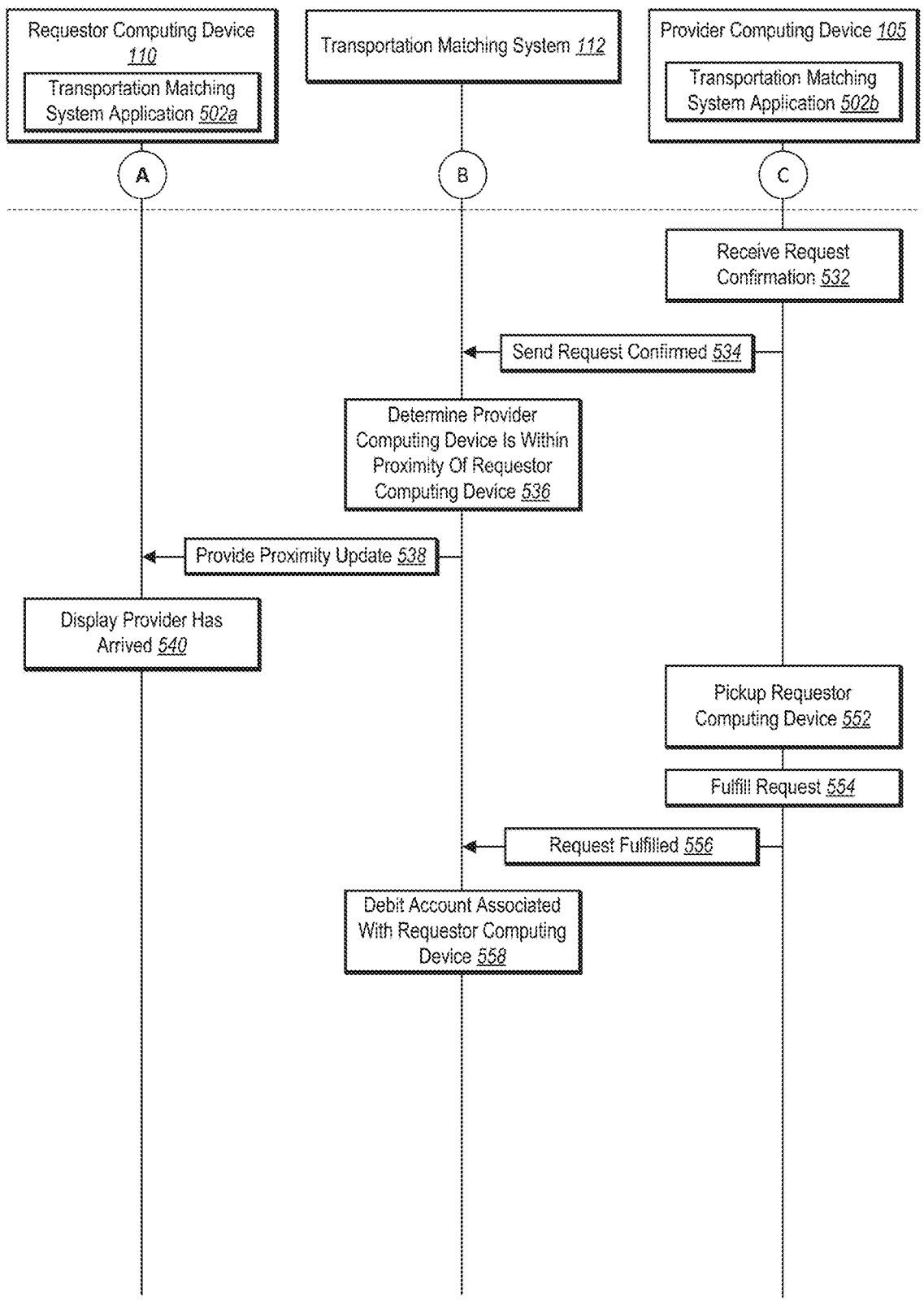

FIGS. 5A and 5B illustrate a sequence of acts whereby the transportation matching system 112 enables the requestor computing device 110 to generate and send a transportation request. For example, as shown in FIG. 5A, the transportation matching system application 502a installed on the requestor computing device 110 monitors various types of activities (504) both in association with the transportation matching system application 502a and in association with other applications and functions of the requestor computing device 110. For instance, the transportation matching system application 502a monitors a request history associated with the transportation matching system application 502a. In one or more embodiments, the request history includes a list of requests sent via the transportation matching system application 502a. Each request in the list of requests includes information including, but not limited to, a pickup location, a destination location, preference selections, transportation duration (e.g., how long it took to travel from the pickup location to the destination location), whether the request was canceled prior to the request being fulfilled, and a driver rating.

Further, the transportation matching system application 502a installed on the requestor computing device 110 monitors activities associated with other applications and functions including, but not limited to: event information specified within a calendar application, information within a text messaging or SMS application, information within an email application, and social media activity information associated with a social media system application. For example, the transportation matching system application 502a monitors calendar events entered into a calendar application installed on the requestor computing device 110. Similarly, the transportation matching system application 502a monitors text messages and emails sent and received by communication applications installed on the requestor computing device 110. Additionally, the transportation matching system application 502a monitors social media activity engaged in via a social media application installed on the requestor computing device 110. In one or more embodiments, the transportation matching system application 502a monitors activities on the requestor computing device 110 as a background process that occurs even when the transportation matching system application 502a is not initialized or active on the requestor computing device 110.

After monitoring various activities, the requestor computing device 110 detects the initialization (506) of the transportation matching system application 502a. For example, in at least one embodiment, the requestor computing device 110 detects a user selection of an icon (e.g., displayed on a home screen the requestor computing device 110) or a file (e.g., stored on the requestor computing device 110) that initializes a display associated with the transportation matching system application 502a. In response to detecting the initialization of the transportation matching system application 502a, the requestor computing device 110 requests (508) that the transportation matching system 112 send one or more destination options customized for the requestor computing device 110. In at least one embodiment, the request (508) for destination options also includes the monitored activity previously collected by the requestor computing device 110.

In response to receiving the request for one or more top destinations from the requestor computing device 110, the transportation matching system 112 identifies (510) a request matching pattern associated with the requestor computing device 110. For example, the transportation matching system 112 analyzes the request history associated with the transportation matching system application 502a installed on the requestor computing device 110 in order to identify or otherwise generate a request matching pattern associated with the requestor computing device 110. To illustrate, the transportation matching system 112 analyzes the request history associated with the transportation matching system application 502a to identify commonly requested pickup locations and destinations. Thus, in at least one embodiment, the transportation matching system 112 generates the request matching pattern associated with the requestor computing device 110 to include likely pickup and destination locations for the requestor computing device 110 at any time on any given day.

In at least one embodiment, the transportation matching system 112 identifies and scores (512) one or more destination options. For example, one or more destination options by comparing the current time and location associated with the requestor computing device 110 against the request matching pattern. To illustrate, if the current location and time associated with the requestor computing device 110 are represented in an entry in the request matching pattern, the transportation matching system 112 can identify the destination associated with that entry as a destination option. If the current location and/or time associated with the requestor computing device 110 are within a threshold amount of time or distance as an entry in the request matching pattern (e.g., within thirty minutes, within a one mile radius), the transportation matching system 112 can identify the destination associated with that entry as a destination option.

In one or more embodiments, the transportation matching system 112 does not limit the identification of destination options to only previously requested destinations, as may be indicated by the request matching pattern. For example, in at least one embodiment, the transportation matching system 112 utilizes additional activity indicated by the requestor computing device 110 to identify destination options. For instance, the transportation matching system 112 can also identify destination options by analyzing calendar information provided by the requestor computing device 110. To illustrate, the calendar information provided by the requestor computing device 110 may include a calendar event for an event occurring in the same geographical area (e.g., the same city or region) where the requestor computing device 110 is located at a time that is within a threshold amount of time from the current time (e.g., in the next thirty minutes). Accordingly, the transportation matching system 112 can determine that a destination option associated with the requestor computing device 110 is the location of the imminent and nearby event outlined in the calendar event provided by the requestor computing device 110.

Furthermore, the transportation matching system 112 can identify destination options by analyzing social media information provided by the requestor computing device 110. For example, the social media information provided by the requestor computing device 110 may include information related to social media posts, comments, events, and check-ins. In one or more embodiments, the transportation matching system 112 can analyze this information to identify an imminent and nearby event that the requestor is likely to attend, based on sentiments expressed in the analyzed social media information. For instance, the transportation matching system 112 can analyze information related to a social media post submitted to a social media network by the requestor computing device 110 that includes the text, "Can't wait to have dinner at Ben's Diner on my next visit to Portland!" In response to determining the requestor computing device 110 is currently located in Portland and that it is 7:00 pm, the transportation matching system 112 can identify "Ben's Diner" as a destination option.

Additionally, the transportation matching system 112 can identify destination options based on an analysis of messaging information (e.g., text messages, SMS messages, transcribed voicemails) provided by the requestor computing device 110. For example, the transportation matching system 112 can analyze the messaging information related to a text message sent by the requestor computing device 110 that includes the text, "Let's meet at the library at 3:00 pm tomorrow." In response to determining the date associated with the requestor computing device 110 corresponds to the "tomorrow" mentioned in the text message and that the current time associated with the requestor computing device 110 is within a threshold of 3:00 pm, the transportation matching system 112 can identify "the library" as a destination option.

In one or more embodiments, the transportation matching system 112 can also identify destination options based on nearby events. For example, the transportation matching system 112 can perform Internet searches in order to identify nearby concerts, plays, and other events. In at least one embodiment, the transportation matching system 112 can determine that the requestor is likely to attend a particular nearby event based on an analysis of the provided activity information. For instance, the transportation matching system 112 can identify interests and hobbies of the requestor based on the provided activity information, and can identify the location of a nearby event as a destination option based on a determination that the event aligns with the requestor's interests or hobbies.

After identifying one or more destination options, the transportation matching system 112 calculates a score (512) for each identified destination option. In at least one embodiment, the transportation matching system 112 utilizes the calculated scores to rank the destination options and to identify top destination options to provide to the requestor computing device 110. For example, in one or more embodiments, the transportation matching system 112 calculates a score for a destination option based on how well the destination option correlates with the generated request matching pattern. For example, in response to determining that the current location and time associated with the requestor computing device 110 are represented in the same entry in the request matching pattern as a destination option, the transportation matching system 112 calculates a high score for that destination option. Alternatively, in response to determining a destination option is represented in a request matching pattern entry that includes a time and location that are within a threshold level of similarity to the current time and location of the requestor computing device 110, the transportation matching system 112 calculates a medium score for that destination option. Further, in response to determining a destination option is represented in a request matching pattern entry that includes a time and location that are not within a threshold level of similarity to the current time and location of the requestor computing device 110, the transportation matching system 112 calculates a low score for that destination option.

Additionally, the transportation matching system 112 can further weight the score for a destination option based on one or more heuristics. For example, the transportation matching system 112 may include a heuristic that the destination options identified based on calendar events are very likely to be selected by a requestor. Accordingly, the transportation matching system 112 can place a heavy weight on a calculated score for a destination option identified based on a calendar event. Similarly, the transportation matching system 112 may include a heuristic that the scores for destination options identified based on social media activity information are weighted based on a sentiment analysis of the social media activity. Further, the transportation matching system 112 may include a heuristic that destination options associated with nearby events are weighted based on how well the event correlates with identified interests or hobbies of the requestor.

After identifying and scoring (512) one or more destination options, the transportation matching system 112 provides the scored destination options (514) to the requestor computing device 110. As discussed above, in one or more embodiments, the transportation matching system 112 provides the destination options (514) to the requestor computing device 110 in response to the requestor computing device 110 requesting destination options (508) upon the detected initialization (506) of the transportation matching system application 502a. Accordingly, in one or more embodiments, the requestor computing device 110 detects a user interaction that meets a first threshold (516), and then provides a list of destination options (518) among the destination options provided by the transportation matching system 112.

For example, in one or more embodiments, the requestor computing device 110 detects a user interaction such as a touch gesture made in connection with a touch screen display (e.g., the touch screen display 202 of the requestor computing device 110 illustrated in FIG. 2A). In at least one embodiment, the requestor computing device 110 detects a horizontal swipe touch gesture in connection with a particular destination option provided via the transportation matching system application 502a. Alternatively, the requestor computing device 110 can detect the swipe-up touch gesture in connection with any portion of a display provided via the transportation matching system application 502a, as described with reference to FIGS. 3A-3E. Alternatively or additionally, the requestor computing device 110 can detect another type of touch gesture such as a tap touch gesture, as described with reference to FIGS. 4A-4D.

As mentioned above, the requestor computing device 110 detects the user interaction meet a first threshold (516). For example, the transportation matching system application 502a can provide a graphical user interface that is divided into one or more portions. In response to the user interaction moving beyond a first portion of the provided graphical user interface, the requestor computing device 110 can determine that the user interaction has met the first threshold. To illustrate, the first portion of a graphical user interface (e.g., the transportation request graphical user interface 204) may be a bottom portion (e.g., the bottom third portion) of the graphical user interface. Accordingly, in at least one embodiment, if the user interaction is a swipe-up touch gesture that begins at the bottom of the graphical user interface, the requestor computing device 110 determines the user interaction has met the first threshold when the swipe-up touch gesture moves beyond a bottom third portion of the graphical user interface.

In response to detecting that the user interaction meets the first threshold (516), the requestor computing device 110 provides the list of destination options (518). For example, the requestor computing device 110 can provide the list of destination options by ordering the received destination options (e.g., as in step (514)) according to the calculated score for each destination option. The requestor computing device 110 can provide a top number of destination options (e.g., the top three destination options), or can provide a top percentage of destination options (e.g., the top five percent of received destination options). Alternatively, the requestor computing device 110 can provide a number of top destination options that depends on the size of the touch screen display associated with the requestor computing device 110.

In at least one embodiment, the requestor computing device 110 provides the top destination options one-by-one as a graphical user interface associated with the transportation matching system application 502a scrolls up in connection with the detected swipe-up touch gesture. Accordingly, the display of the top destination options coincides with the continued swipe-up touch gesture (e.g., meaning the swipe-up touch gesture is not released while the requestor computing device 110 displays the top destination options). In one or more embodiments, as the user interaction continues in connection with the touch screen display of the requestor computing device 110, the requestor computing device detects the user interaction meet a second threshold (520). For example, the requestor computing device can determine the user interaction has moved beyond the second threshold when the user interaction (e.g., a swipe-up touch gesture) moves beyond a middle portion of a graphical user interface provided by the transportation matching system application 502a.

In response to detecting the user interaction has moved beyond a second threshold (520), the requestor computing device 110 generates a request based on the first destination option (522) in the list of destination options. For example, the requestor computing device 110 can generate the request including the current location of the requestor computing device 110, the first destination option from the ordered listing of top destination options, and any other preferences specified by a user profile stored by the requestor computing device 110 (e.g., child seat preferences, pet friendly preferences, wheelchair accessible preferences). The requestor computing device 110 then sends the generated request (524) via the transportation matching system application 502a to the transportation matching system 112.

When the transportation matching system 112 receives the generated request from the requestor computing device 110, the transportation matching system 112 matches the request to a provider (526). For example, the transportation matching system 112 matches the request to a provider based on a variety of factors including provider proximity, requestor preferences, and provider preferences. In one or more embodiments, the transportation matching system 112 provides updates on the match process (528) to the requestor computing device 110 (e.g., "We are finding you a ride. . . "). After identifying a provider computing device 104 that is a suitable match to the request, the transportation matching system 112 requests a match confirmation (530) from the provider computing device 104 via the transportation matching system application 502b. In response to receiving a request confirmation (532) as shown in FIG. 5B, the provider computing device 104 sends the request confirmation (534) to the transportation matching system 112. The transportation matching system 112 can then determine whether the provider computing device is within a proximity of the requestor computing device (536) in order to provide proximity updates (538) to the requestor computing device 110 (e.g., "Your ride is a few minutes away"). When the proximity update (538) is within a threshold distance of the requestor computing device 110, the requestor computing device 110 can display that the provider has arrived (540).

At this point, the provider computing device 104 determines that the requestor computing device has been picked up (542) as shown in FIG. 5B, and then that the request has been fulfilled (544) (e.g., the transportation has been provided). When the request is fulfilled, the provider computing device 104 sends an update to the transportation matching system 112 that request has been fulfilled (546). The transportation matching system 112 then debits an account associated with the requestor computing device 110 in order to pay (548) the account associated with the provider computing device 104.

Figure 6:
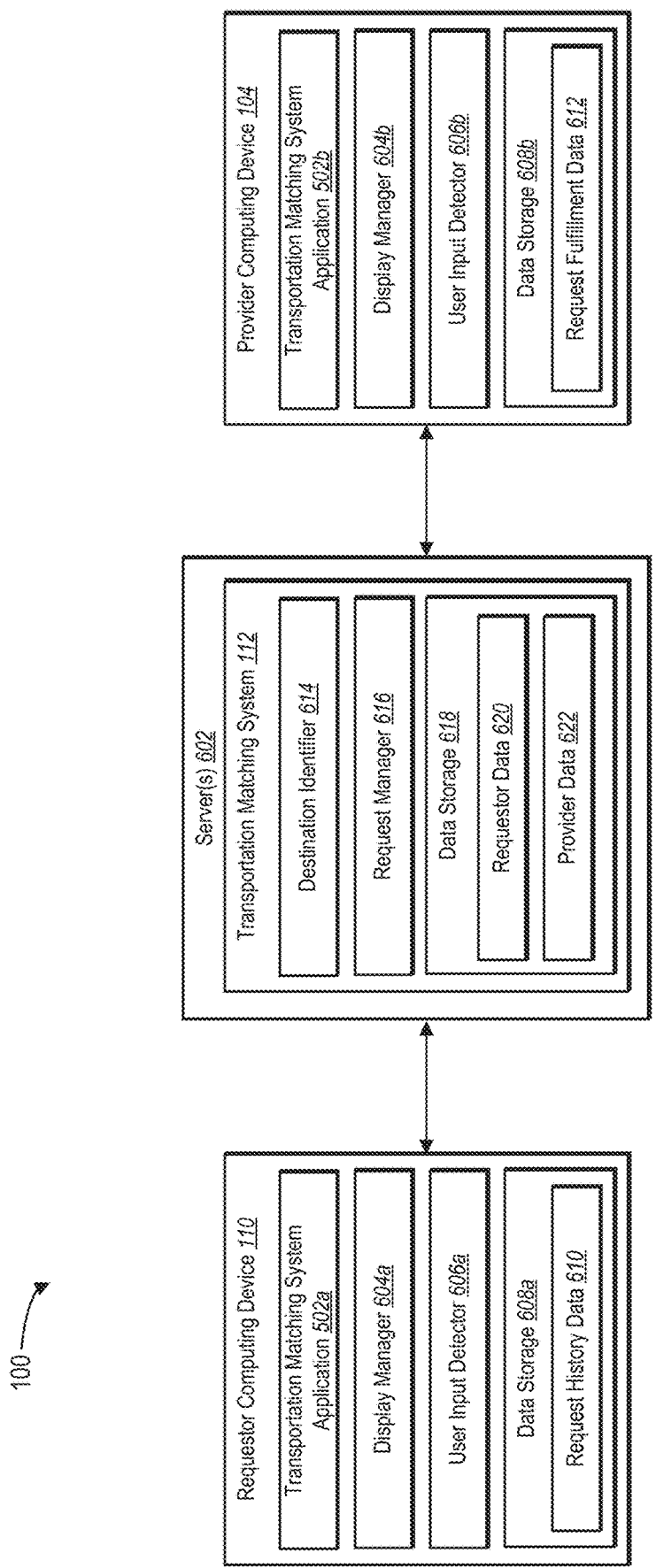
FIG. 6 illustrates a detailed schematic diagram of the transportation matching system in accordance with one or more embodiments.

FIG. 6 illustrates a schematic diagram illustrating an example embodiment of the transportation matching system 112. As shown in FIG. 6, the transportation matching system 112 is implemented by at least one requestor computing device 110, at least one provider computing device 104, and server(s) 602, and includes various components for performing the processes and features described herein. For example, as shown in FIG. 6, the transportation matching system 112 includes, but is not limited to, the requestor computing device 110 and the provider computing device 104, each including the transportation matching system application 502*a*, 502*b*, the display manager 604*a*, 604*b*, the user input detector 606*a*, 606*b*, and the data storage 608*a*, 608*b* including request history data 610 and request fulfillment data 612, respectively. Also shown in FIG. 6, the server(s) 602 hosts the transportation matching system 112 including the destination identifier 614, the request manager 616, and the data storage 618 including requestor data 620 and provider data 622.

Each of the components 502*a*, 502*b*, 602*a*, 602*b* through 608*a*, 608*b*, and the components 614-618 of the transportation matching system 112 can be implemented using a computing device including at least one processor executing instructions that cause the transportation matching system 112 to perform the processes described herein. In some embodiments, the components 502*a*, 502*b*, 602*a*, 602*b* through 608*a*, 608*b*, and the components 614-618 of the transportation matching system 112 of the transportation matching system 112 can be implemented by the server(s) 602, or across multiple server devices. Additionally or alternatively, a combination of one or more server devices and one or more client devices can implement the components of the transportation matching system 112 in a different arrangement than illustrated in FIG. 6. Additionally or alternatively, the components of the transportation matching system 112 can comprise a combination of computer-executable instructions and hardware.

In one or more embodiments, the transportation matching system application 502*a*, 502*b* is a native application installed on the requestor computing device 110 and on the provider computing device 104, respectively. For example, the transportation matching system application 502*a*, 502*b* can be a mobile application that installs and runs on a mobile device, such as a smart phone, tablet computer, or smart wearable. Alternatively, the transportation matching system application 502*a*, 502*b* can be a desktop application, widget, or other form of a native computer program. Furthermore, the transportation matching system application 502*a*, 502*b* may be a remote application accessed by the requestor computing device 110 or provider computing device 104. For example, the transportation matching system application 502*a*, 502*b* may be a web application that is executed within a web browser of the requestor computing device 110 or provider computing device 104.

In one or more embodiments, the transportation matching system application 502*a*, 502*b* enables a requestor or provider to interact with one or more features of the transportation matching system 112. For example, in order to provide the transportation matching system 112 with information upon which to base destination predictions, the transportation matching system application 502*a* monitors activity data associated with the requestor computing device 110 and provides the monitored data to the transportation matching system 112. For instance, the transportation matching system application 502*a* monitors request history information associated with the requestor computing device 110. In one or more embodiments, request history information includes information associated with each request configured, sent, or canceled from the requestor computing device 110. This request history information can include, but is not limited to, pickup locations, pickup times, destination locations, destination times, provider ratings, and preference selections (e.g., music preferences, route preferences, accessibility preferences). In at least one embodiment, the transportation matching system application 502*a* provides this monitored request history information to the transportation matching system 112.

Furthermore, the transportation matching system application 502*a* monitors other activity associated with the requestor computing device 110 outside of request history information. For example, in one or more embodiments, the transportation matching system application 502*a* monitors activities associated with other applications installed on the requestor computing device 110. In at least one embodiment, the transportation matching system application 502*a* monitors calendar application activities including calendar information (e.g., a description of a calendar event along with the date, time, and location of the event), text messaging information (e.g., the body of a text or SMS message, the metadata associated with the text message including the date and time received, the sender associated with the text message), email information, and social media information (e.g., posts, comments, uploads, "likes," shares, private messages). For example, the transportation matching system application 502*a* may ask the requestor to opt-in to sharing social media information with the transportation matching system 112 by providing social media login information. In one or more embodiments, the transportation matching system application 502*a* provides this additional monitored activity information to the transportation matching system 112.

Additionally, the transportation matching system application 502*a* generates and sends requests to the transportation matching system 112. As described above, in response to one or more detected user interactions with a display of the requestor computing device 110, the transportation matching system application 502*a* can generate a request for a provider to come to the current or future location of the requestor computing device 110 in order to provide transport to a specified destination. Accordingly, in response to detecting one or more user interactions, the transportation matching system application 502*a* generates a request. To illustrate, in response to a detected single interaction that moves past a first threshold and a second threshold in connection with an ordered listing of top destination options, the transportation matching system application 502*a* generates a request including the current location of the requestor computing device 110 as the pickup location, the first destination in the ordered listing of top destination options as the destination location, the current time associated with the requestor computing device 110 as the pickup time, along with any preferences previously specified in a transportation matching system account associated with the requestor computing device 110. In one or more embodiments, the transportation matching system application 502*a* generates the request as a system call with the specific request information as parameters. Alternatively, the transportation matching system application 502*a* can generate the request, including the specific request information, as an electronic message, as metadata, or as a text file. After generating the request, the transportation matching system application 502*a* sends the request to the transportation matching system 112.

In one or more embodiments, the transportation matching system application 502*a* also receives information from the transportation matching system 112. For example, in response to sending monitored activity information to the transportation matching system 112, the transportation matching system application 502a can receive a collection of scored destination options. Further, in response to sending a generated request to the transportation matching system 112, the transportation matching system application 502a can receive updates on the request matching process (e.g., "We're finding you a ride"), as well as updates on the proximity of the match (e.g., "Your driver is 2 minutes away").

Also shown in FIG. 6, the requestor computing device 110 and the provider computing device 104 include the display manager 604a, 604b, respectively. In one or more embodiments, the display manager 604a, 604b generates, provides, manages, and/or controls one or more graphical user interfaces that allow a requestor or provider to interact with features of the transportation matching system 112. For example, the display manager 604a, 604b generates a graphical user interface ("GUI") that includes information received and provided by the transportation matching system application 502a, 502b, along with other selectable controls.

In at least one embodiment, the display manager 604a, 604b also generates portions of a GUI. For example, in at least one embodiment, the display manager 604a generates a list of destination options based on the scored destination options received by the transportation matching system application 502a from the transportation matching system 112. The display manager 604a can generate the list by placing the received destination options in the list based on the score assigned to each destination option. In one or more embodiments, the display manager 604a includes a number of top destination options (e.g., the top three destination options) in the ordered list. Alternatively, the display manager 604a can include a percentage of top destination options, or simply a number of top destination options with a calculated score above a threshold amount.

In general, the display manager 604a, 604b facilitates the display of a graphical user interface. For example, the display manager 604a, 604b may compose the graphical user interface of a plurality of graphical components, objects, and/or elements that allow a requestor or provider to engage with features of the transportation matching system 112. More particularly, the display manager 604a, 604b may direct the requestor computing device 110 or the provider computing device 104 to display a group of graphical components, objects, and/or elements that enable a requestor or provider to interact with various features of the transportation matching system 112.

In addition, the display manager 604a, 604b directs the requestor computing device 110 or provider computing device 104 to display one or more graphical objects, controls, or elements that facilitate user input for interacting with various features of the transportation matching system 112. To illustrate, the display manager 604a provides a graphical user interface that allows for a requestor to perform a swipe-up touch gesture in connection with an ordered list of top destination options. The display manager 604a, 604b also facilitates the input of text or other data for the purpose of interacting with one or more features of the transportation matching system 112. For example, the display manager 604a provides a GUI that functions in connection with a touch screen keyboard. A requestor can interact with the touch screen keyboard to manually input request information.

Furthermore, the display manager 604a, 604b is capable of transitioning between two or more GUIs. For example, in one embodiment, the display manager 604a provides a transportation request graphical user interface (e.g., as shown in FIG. 3A). Later, in response to a detected swipe-up touch gesture, the display manager 604a rolls the transportation request GUI up along with the swipe-up touch gesture in order to further display an ordered list of top destination options.

As further illustrated in FIG. 6, the requestor computing device 110 and the provider computing device 104 include the user input detector 606a, 606b, respectively. In one or more embodiments, the user input detector 606a, 606b detects, receives, and/or facilitates user input. In some embodiments, the user input detector 606a, 606b detects one or more user interactions with respect to a graphical user interface. As referred to herein, a "user interaction" means a single interaction received from a requestor or provider by way of one or more input devices. For example, the user input detector 606a, 606b detects a user interaction from a touch screen display, a keyboard, a mouse, a stylus, a touch pad, or any other input device. In the event the requestor computing device 110 or the provider computing device 104 include a touch screen display, the user input detector 606a, 606b detects one or more touch gestures (e.g., swipe gestures, tap gestures, pinch gestures, reverse-pinch gestures) that form a user interaction. In some embodiments, the user input detector 606a, 606b detects touch gestures in relation to and/or directed at one or more graphical objects or graphical elements of a graphical user interface.

The user input detector 606a, 606b also detects the completion of one or more user interactions. For example, the user input detector 606a, 606b can detect the release of a swipe-up touch gesture. Additionally, the user input detector 606a, 606b can detect other characteristics of a user interaction. For instance, the user input detector 606a, 606b can detect the velocity and direction of a swipe touch gesture, the direction and incline of a tilt user interaction, and so forth.

The user input detector 606a, 606b may additionally, or alternatively, receive data representative of a user interaction. For example, the user input detector 606a, 606b may receive one or more user configurable parameters, one or more text or voice commands, or any other suitable user input. The user input detector 606a, 606b may receive input data from one or more components of the transportation matching system 112 or from one or more remote locations.

The transportation matching system 112, and more specifically the transportation matching system application 502a, 502b performs one or more functions in response to the user input detector 606a, 606b detecting user input and/or receiving other data. Generally, a requestor or provider can control, navigate within, and otherwise use the transportation matching system 112 by providing one or more user inputs that the user input detector 606a, 606b can detect. For example, in response to the user input detector 606a detecting a horizontal swipe touch gesture that moves beyond a first and second threshold in connection with an list of destination options, the transportation matching system application 502a can generate and send a request to the transportation matching system 112.

As further illustrated in FIG. 6, the requestor computing device 110 and the provider computing device 104 include a data storage 608a, 608b, respectively. The data storage 608a includes request history data 610. In one or more embodiments, the request history data 610 includes request history information, such as described herein. The data storage 608b includes request fulfillment data 612. In one or more embodiments, the request fulfillment data 612 includes request fulfillment information, such as described herein.

As shown in FIG. 6, and as mentioned above, the server(s) 602 hosts the transportation matching system 112. In one or more embodiments, the transportation matching system 112 predicts destination options that are customized to the requestor computing device 110. Furthermore, in response to receiving a request from the requestor computing device, the transportation matching system 112 matches the request to the best available provider computing device 104 and facilitates the fulfillment of the request as well as the payment of the provider. As further illustrated in FIG. 6, and as mentioned above, the transportation matching system 112 includes a destination identifier 614, a request manager 616, and a data storage 618.

In one or more embodiments, the destination identifier 614 predicts and provides one or more destination options that are customized to the requestor computing device 110. For example, as described above the transportation matching system application 502a can provide monitored activity information to the transportation matching system 112. In response to receiving this monitored activity information, the destination identifier 614 identifies destination options that are customized to the requestor computing device 110, and scores each identified destination option such that the top destination options can be displayed by the requestor computing device 110.

In one or more embodiments, the destination identifier 614 begins the process of identifying destination options by generating a request matching pattern associated with the requestor computing device 110. In at least one embodiment, the request matching pattern associated with the requestor computing device 110 represents the pickup locations, destinations, dates, and times that are frequently included in requests sent by the requestor computing device 110. For example, the destination identifier 614 can identify the requestor computing device 110 makes a request every weekday at 6:30 pm that includes a pickup at the same building downtown, and a destination at the same address in the suburbs. The destination identifier 614 can then include this request as part of the request matching pattern associated with the requestor computing device 110. In one or more embodiments, the destination identifier 614 can determine that a request belongs in the request matching pattern when the same request (e.g., same pickup location, same time, same destination location) is made more than once. Alternatively, the destination identifier 614 can determine that a request belongs in the request matching pattern when it is made more than a threshold number or percentage of times. The resulting request matching pattern identifies where a requestor computing device 110 is likely to request transport to depending on when and where the requestor computing device 110 is when the transportation matching system application 512a is initialized.

After generating the request matching pattern customized for the requestor computing device 110, the destination identifier 614 utilizes the request matching pattern and the current time and location of the requestor computing device 110 to identify destination options customized for the requestor computing device 110. For example, if the current time and location associated with the requestor computing device 110 (e.g., 6:30 pm on a weekday outside a building downtown) are represented in the request matching pattern, the destination identifier 614 can identify the destination (e.g., an address in the suburbs) associated with the time and location in the request matching pattern. If the current time and location of the requestor computing device 110 are not represented in the request matching pattern, the destination identifier 614 can identify similar times and locations in the request matching pattern in order to determine a destination option. For example, if the time and location associated with the requestor computing device 110 are 4:30 pm on a weekday outside the downtown building, the destination identifier 614 can determine that this time and location are within a threshold level of similarity to the existing entry in the request matching pattern. The destination identifier 614 can then identify the associated destination in the request matching pattern as a destination option for the requestor computing device 110.

In one or more embodiments, the destination identifier 614 identifies destination options for the requestor computing device 110 based on other types of monitored activity information. For example, the destination identifier 614 can analyze monitored calendar activity information to identify the times and locations associated with calendar events stored by the requestor computing device 110. To illustrate, the destination identifier 614 can compare the current time and location of the requestor computing device 110 against upcoming events specified by the monitored calendar activity information. In response to determining that a calendar event is occurring within a threshold amount of time of the current time, and within a threshold distance of the current location of the requestor computing device 110, the destination identifier 614 can identify a location associated with the calendar event as a destination option for the requestor computing device 110.

Additionally, the destination identifier 614 identifies destination options for the requestor computing device 110 based on text messaging activity information. For example, the destination identifier 614 can analyze any number of text messages received by the requestor computing device 110 in order to identify event information (e.g., "Let's meet tonight for dinner at Ben's Diner!"). In response to determining the indicated event is occurring within a threshold amount of time of the current time, and within a threshold distance of the current location of the requestor computing device 110, the destination identifier 614 can identify a location associated with the indicated event as a destination option for the requestor computing device 110.

Moreover, the destination identifier 614 identifies destination options for the requestor computing device 110 based on social media activity information. For example, the destination identifier 614 can analyze social media comments, posts, check-ins, shares, and messages to identify event information. In response to determining an indicated event is occurring within a threshold amount of time of the current time, and within a threshold distance of the current location of the requestor computing device 110, the destination identifier 614 can identify a location associated with the indicated event as a destination option for the requestor computing device 110.

In at least one embodiment, the destination identifier 614 identifies destination options for the requestor computing device 110 based on an analysis of nearby event. For example, the destination identifier 614 can perform Internet searches and/or social media searches to identify events that are occurring within a threshold distance of the requestor computing device 110 and within a threshold amount of time from the current time associated with the requestor computing device 110. In one or more embodiments, the destination identifier 614 identifies destination options based on nearby events in response to determining that the nearby event correlates with an interest or hobby of the requestor. For example, the destination identifier 614 can determine interests or hobbies of the requestor based on the requestor's profile information, the monitored social media activity information, or the request matching pattern.

Regardless of the activities upon which the destination identifier 614 identifies destination options, the destination identifier 614 utilizes various techniques to analyze the monitored and searched information. For example, in one or more embodiments, the destination identifier 614 utilizes natural language processing to analyze calendar information, text messages, social media activity information, and so forth. Additionally, the destination identifier 614 may also utilize sentiment analysis to determine the requestor's level of enthusiasm related to events and locations identified in analyzing the provided activity information. In additional embodiments, the destination identifier 614 may also utilize machine learning, Internet searches, database lookups, and any other applicable analysis technique.

In order to provide the top destination options via a display of the requestor computing device 110, the destination identifier 614 also calculates a score for each identified destination option that represents the strength of the prediction associated with the destination option. In other words, the score represents the likelihood that the associated destination option is actually where the requestor actually wants to go at the current time. In one or more embodiments, the destination identifier 614 calculates the score for an identified destination option based on how well the identified destination option correlates with the request matching pattern. For example, if the current location, current time, and the identified destination option are represented by a single entry in the request matching pattern (e.g., meaning the requestor computing device 110 has made a request from the current location and time for the identified destination option previously), the destination identifier 614 calculates a high score for that destination option. If the current location, current time, and the identified destination option are not represented by a single entry in the request matching pattern, but are represented across more than one entry in the request matching pattern (e.g., meaning the requestor computing device 110 has sent requests similar to a request for the current location, time, and identified destination option), the destination identifier 614 calculates a medium score for that destination option. If the current location, current time, and the identified destination option are not represented across any entries in the request matching pattern, the destination identifier 614 calculates a low score for that destination option.

In at least one embodiment, the destination identifier 614 further weights the calculated scores for the identified destination options based on sentiment analysis and other heuristics. For example, if the destination identifier 614 identified a destination option based on monitored calendar activity (e.g., meaning the destination option is associated with an event in the calendar application of the requestor computing device 110), the destination identifier 614 can place a heavy weight on the calculated score for that destination option. In other words, in at least one embodiment the destination identifier 614 operates under a heuristic that assumes the requestor is more likely to want to go to a calendar event. In another example, if the destination identifier 614 identified a destination option based on monitored text messaging activity or monitored social media activity, the destination identifier 614 can place a less heavy weight on the calculated scores for those destination options under an assumption that those destination options are associated with less formal plans. After calculating and weighting scores for each identified destination option, the destination identifier 614 provides the scored destination options to the transportation matching system application 502a for display via the requestor computing device 110.

Further shown in FIG. 6, the transportation matching system 112 includes the request manager 616. In one or more embodiments, the request manager 616 receives requests and matches each request to a suitable provider. The request manager 616 further receives confirmation and location updates from the provider computing device 104 and communicates these updates to the requestor computing device 110. Upon determining a request has been fulfilled by the provider computing device 104, the request manager 616 debits a payment account associated with the requestor computing device 110 in order to provide payment to the account associated with the provider computing device 104.

Additionally shown in FIG. 6, the transportation matching system 112 includes the data storage 618. The data storage 618 includes requestor data 620 and provider data 622. In one or more embodiments, the requestor data 620 includes requestor information, such as described herein. In one or more embodiments, the provider data 622 includes provider information, such as described herein.

FIGS. 1-6, the corresponding text and examples, provide a number of different methods, systems, and devices for generating and sending a request in response to a single user interaction. In addition to the foregoing, embodiments can also be described in terms of flowcharts comprising acts and steps in a method for accomplishing a particular result. For example, FIG. 7 may be performed with less or more steps/acts or the steps/acts may be performed in differing orders. Additionally, the steps/acts described herein may be repeated or performed in parallel with one another or in parallel with different instances of the same or similar steps/acts.

Figure 7:
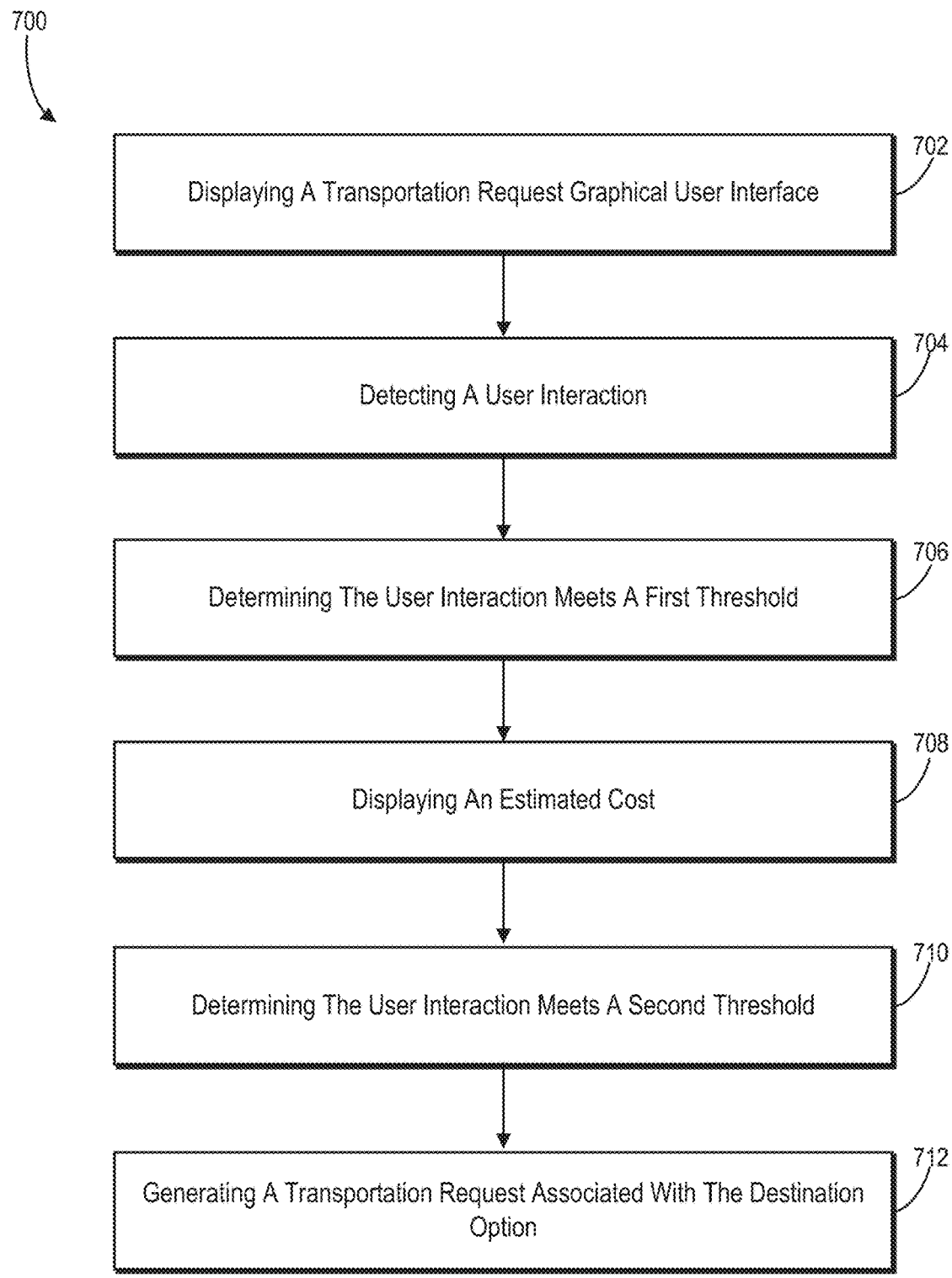
FIG. 7 illustrates a flowchart of a series of acts in a method of sending a request in response to a single user interaction in accordance with one or more embodiments.

FIG. 7 illustrates a flowchart of one example method 700 of generating and sending a request in response to a single user interaction. The method 700 includes an act 702 of displaying a transportation request graphical user interface. For instance, the act 702 can involve displaying a transportation request graphical user interface comprising a list of destination options. For example, in at least one embodiment, displaying the transportation request graphical user interface including the list of destination options is based on an analysis of a request history associated with the requestor computing device. In one or more embodiments, the method 700 includes an act of identifying the list of destination options based on a request matching pattern associated with the requestor computing device, wherein the request matching pattern comprises one or more entries, wherein each entry comprises a pickup time and location, and an associated destination location.

For example, in at least one embodiment, the list of destination options is organized based on an analysis of monitored activity information associated with the requestor computing device, wherein the monitored activity information comprises one or more of monitored request history information, monitored application activity information, or monitored social media activity information. Additionally, in at least one embodiment, the list of destination options is further organized based on an analysis of a level of social media activity associated with an event occurring within a threshold amount of time of the current time and a threshold distance from the current location of the requestor computing device. Furthermore, in one or more embodiments, the method 700 includes an act of receiving a plurality of scored destination options, wherein displaying the transportation request graphical user interface comprising the list of destination options comprises displaying the transportation request graphical user interface comprising the list of one or more of the scored destination options with the highest scores. For example, in at least one embodiment, a score associated with each of the plurality of scored destination options is based on one or more of a correlation between the scored destination option and the request matching pattern, a correlation between the scored destination option and the monitored activity information associated with the requestor computing device, or a level of social media activity associated with an event correlated with the scored destination option.

The method 700 also includes an act 704 of detecting a user interaction. For instance, the act 704 can involve detecting a user interaction with a destination option in the list of destination options. In one or more embodiments, detecting a user interaction with a destination option in the list of destination options comprises detecting that a horizontal swipe touch gesture with the destination option.

Additionally, the method 700 includes an act 706 of determining the user interaction meets a first threshold. For instance, determining that the user interaction meets the first threshold includes at least one of determining that the user interaction moves past a first threshold amount of the transportation request graphical user interface, determining that the user interaction exceeds a first threshold amount of touch pressure, or determining that the user interaction exceeds a first threshold amount of hold-time.

Furthermore, the method 700 includes an act 708 of displaying an estimated cost. For instance, the act 708 can involve, in response to determining that the user interaction meets the first threshold, displaying an estimated cost associated with transportation to the destination option. In one or more embodiment, displaying the estimated cost includes calculating the estimated cost based on a distance between the current location of the requestor computing device and a destination location associated with the destination option.

The method 700 also includes an act 710 of determining the user interaction meets a second threshold. For instance, determining that the user interaction meets the second threshold can include at least one of determining that the user interaction moves past a second threshold amount of the transportation request graphical user interface, determining that the user interaction exceeds a second threshold amount of touch pressure, or determining that the user interaction exceeds a second threshold amount of hold-time.

Additionally, the method 700 includes an act 712 of generating a transportation request associated with the destination option. For instance, the act 712 can involve, in response to determining that the user interaction meets the second threshold, generate a transportation request associated with the destination option. Additionally, in one or more embodiments, the method 700 includes an act of sending the generated transportation request to a transportation matching system, the transportation request comprising a current location associated with the requestor computing device, and the destination option.

In one or more embodiments, the method 700 includes an act of, in response to sending the generated transportation request, receiving a transportation request confirmation from the transportation matching system, wherein the transportation request confirmation comprises provider information, destination information, price information, trip time information, preference information, and transportation options. Additionally, in at least one embodiment, the method 700 includes an act of providing, in response to detecting a second user interaction with the list of destination options, a full display of the list including all available destination options in ranked order.

Figure 8:
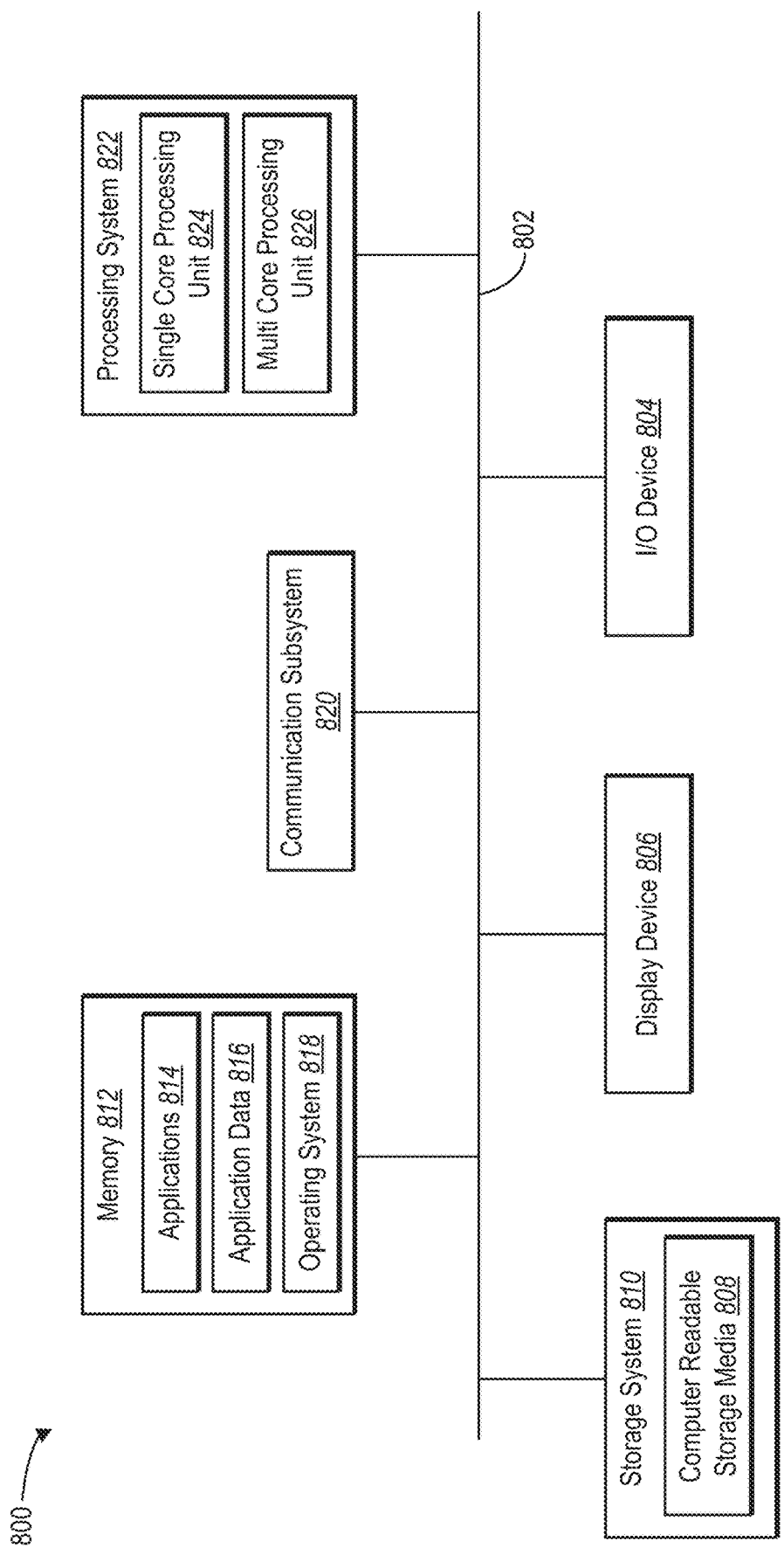
FIG. 8 illustrates a block diagram of an exemplary computing device in accordance with one or more embodiments.

FIG. 8 shows an example computer system 800, in accordance with various embodiments. In one or more embodiments, the computer system 800 may be used to implement any of the systems, devices, or methods described herein. In some embodiments, the computer system 800 may correspond to any of the various devices described herein, including, but not limited to, mobile devices, tablet computing devices, wearable devices, personal or laptop computers, vehicle-based computing devices, or other devices or systems described herein. As shown in FIG. 8, the computer system 800 can include various subsystems connected by a bus 802. The subsystems may include an I/O device subsystem 804, a display device subsystem 806, and a storage subsystem 810 including one or more computer readable storage media 808. The subsystems may also include a memory subsystem 812, a communication subsystem 820, and a processing subsystem 822.

In the computer system 800, the bus 802 facilitates communication between the various subsystems. Although a single bus 802 is shown, alternative bus configurations may also be used. The bus 802 may include any bus or other component to facilitate such communication as is known to one of ordinary skill in the art. Examples of such bus systems may include a local bus, parallel bus, serial bus, bus network, and/or multiple bus systems coordinated by a bus controller. The bus 802 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 804 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 804 may also include identification or authentication devices, such as fingerprint scanners, voiceprint scanners, iris scanners, or other biometric sensors or detectors. In various embodiments, the I/O device subsystem 804 may include audio output devices, such as speakers, media players, or other output devices.

The computer system 800 may include a display device subsystem 806. The display device subsystem 806 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 806 may include a controller and/or interface for controlling and/or communicating with an external display, such as any of the above-mentioned display technologies.

As shown in FIG. 8, the computer system 800 may include the storage subsystem 810 including various computer readable storage media 808, such as hard disk drives, solid state drives (including RAM-based and/or flash-based SSDs), or other storage devices. In one or more embodiments, the computer readable storage media 808 is configurable to store software, including programs, code, or other instructions, that is executable by a processor to provide functionality described herein. In some embodiments, the storage subsystem 810 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 810 can include a media reader, card reader, or other storage interface to communicate with one or more external and/or removable storage devices. In various embodiments, the computer readable storage media 808 can include any appropriate storage medium or combination of storage media. For example, the computer readable storage media 808 can include, but is not limited to, any one or more of random access memory (RAM), read only memory (ROM), electronically erasable programmable ROM (EEPROM), flash memory or other memory technology, optical storage (e.g., CD-ROM, DVD, Blu-ray® disk or other optical storage device), magnetic storage (e.g., tape drives, cassettes, magnetic disk storage or other magnetic storage devices). In some embodiments, the computer readable storage media 808 can include data signals or any other medium through which data can be sent and/or received.

The memory subsystem 812 can include various types of memory, including RAM, ROM, flash memory, or other memory. The memory subsystem 812 can include SRAM (static RAM) or DRAM (dynamic RAM). In some embodiments, the memory subsystem 812 can include a BIOS (basic input/output system) or other firmware configured to manage initialization of various components during for example startup. As shown in FIG. 8, the memory subsystem 812 can include applications 814 and application data 816. The applications 814 may include programs, code, or other instructions, that can be executed by a processor. The applications 814 can include various applications such as browser clients, location management applications, transportation management applications, data management application, and any other application. The application data 816 can include any data produced and/or consumed by the applications 814. The memory subsystem 812 can additionally include operating system 818, such as macOS®, Windows®, Linux®, various UNIX® or UNIX- or Linux-based operating systems or other operating systems.

The computer system 800 can also include a communication subsystem 820 configured to facilitate communication between the computer system 800 and various external computer systems and/or networks (such as the Internet, a LAN, a WAN, a mobile network, or any other network). The communication subsystem 820 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally or alternatively, the communication subsystem 820 can include hardware and/or software components to communicate with satellite-based or ground-based location services, such as GPS (global positioning system). In some embodiments, the communication subsystem 820 may include, or interface with, various hardware or software sensors. The sensors may be configured to provide continuous and/or periodic data or data streams to a computer system through the communication subsystem 820.

As shown in FIG. 8, the processing subsystem 822 can include one or more processors or other devices operable to control the computer system 800. Such processors can include the single core processors 824, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem 822, such as processors 824 and 826, may be used independently or in combination depending on the application.

Figure 9:
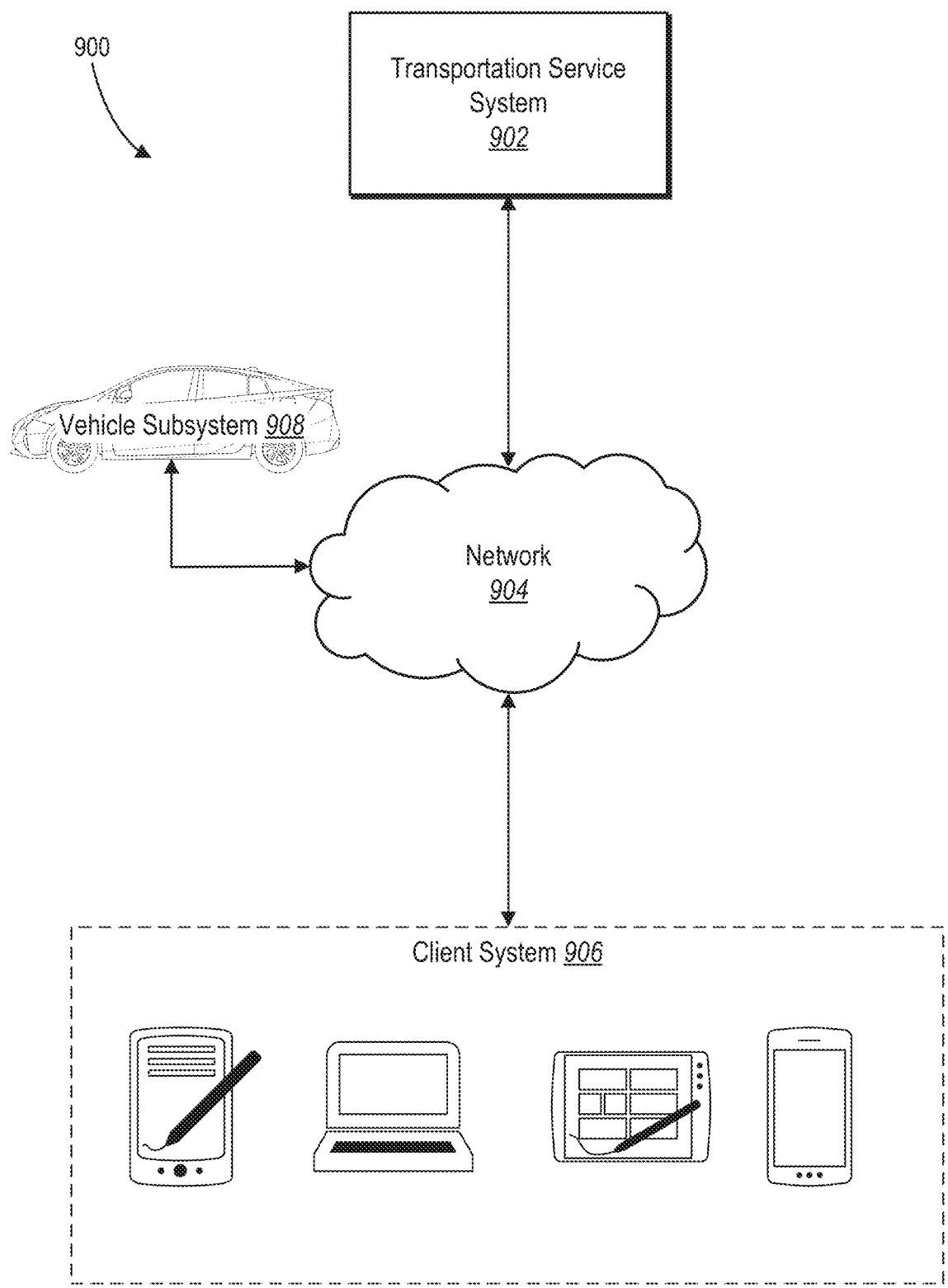
FIG. 9 illustrates an example network environment of a transportation matching system in accordance with one or more embodiments.

FIG. 9 illustrates an example network environment 900 of a transportation service system (e.g., the transportation matching system 112). The network environment 900 includes a client system 906, a transportation service system 902, and a vehicle subsystem 908 connected to each other by a network 904. Although FIG. 9 illustrates a particular arrangement of the client system 906, the transportation service system 902, the vehicle subsystem 908, and the network 904, this disclosure contemplates any suitable arrangement of the client system 906, the transportation service system 902, the vehicle subsystem 908, and the network 904. As an example, and not by way of limitation, two or more of the client system 906, the transportation service system 902, and the vehicle subsystem 908 communicate directly, bypassing the network 904. As another example, two or more of the client system 906, the transportation service system 902, and the vehicle subsystem 908 may be physically or logically co-located with each other in whole or in part. Moreover, although FIG. 9 illustrates a particular number of the client systems 906, the transportation service systems 902, the vehicle subsystems 908, and the networks 904, this disclosure contemplates any suitable number of the client systems 906, the transportation service systems 902, the vehicle subsystems 908, and the networks 904. As an example, and not by way of limitation, the network environment 900 may include multiple client system 906, the transportation service systems 902, the vehicle subsystems 908, and the networks 904.

This disclosure contemplates any suitable network 904. As an example, and not by way of limitation, one or more portions of the network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 904 may include one or more networks 904.

Links may connect the client system 906, the transportation service system 902, and the vehicle subsystem 908 to the communication network 904 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 900. One or more first links may differ in one or more respects from one or more second links.

In particular embodiments, the client system 906 may be an electronic device including hardware, software, or embedded logic components or a combination of two or more such components and capable of carrying out the appropriate functionalities implemented or supported by the client system 906. As an example, and not by way of limitation, a client system 906 may include any of the computing devices discussed above in relation to FIG. 8. A client system 906 may enable a network user at the client system 906 to access a network. A client system 906 may enable its user to communicate with other users at other client systems 906.

In particular embodiments, the client system 906 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 906 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. The client system 906 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation service system 902 may be a network-addressable computing system that can host a transportation network. The transportation service system 902 may generate, store, receive, and send data, such as, for example, user-profile data, concept-profile data, text data, transportation request data, GPS location data, provider data, requester data, vehicle data, or other suitable data related to the transportation network. This may include authenticating the identity of providers and/or vehicles who are authorized to provide transportation services through the transportation service system 902. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation service system 902 may manage transportation matching services to connect a user/requester with a vehicle and/or provider. By managing the transportation matching services, the transportation service system 902 can manage the distribution and allocation of vehicle subsystem resources and user resources such as GPS location and availability indicators, as described herein.

The transportation service system 902 may be accessed by the other components of the network environment 900 either directly or via network 904. In particular embodiments, the transportation service system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation service system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, or a transportation service system 902 to manage, retrieve, modify, add, or delete, the information stored in data store.

In particular embodiments, the transportation service system 902 may provide users with the ability to take actions on various types of items or objects, supported by the transportation service system 902. As an example, and not by way of limitation, the items and objects may include transportation networks to which users of the transportation service system 902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation service system 902 or by an external system of a third-party system, which is separate from the transportation service system 902 and coupled to the transportation service system 902 via a network 904.

In particular embodiments, the transportation service system 902 may be capable of linking a variety of entities. As an example, and not by way of limitation, the transportation service system 902 may enable users to interact with each other or other entities, or to allow users to interact with these entities through an application programming interfaces (API) or other communication channels.

In particular embodiments, the transportation service system 902 may include a variety of servers, sub-systems, programs, modules, logs, and data stores. In particular embodiments, the transportation service system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation service system 902 may also include suitable components such as network interfaces, security mechanisms, load balancers, failover servers, management-and-network-operations consoles, other suitable components, or any suitable combination thereof. In particular embodiments, the transportation service system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation service system 902 and one or more client systems 906. An action logger may be used to receive communications from a web server about a user's actions on or off the transportation service system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from the client system 906 responsive to a request received from the client system 906. Authorization servers may be used to enforce one or more privacy settings of the users of the transportation service system 902. A privacy setting of a user determines how particular information associated with a user can be shared. The authorization server may allow users to opt in to or opt out of having their actions logged by the transportation service system 902 or shared with other systems, such as, for example, by setting appropriate privacy settings. Third-party-content-object stores may be used to store content objects received from third parties. Location stores may be used for storing location information received from the client systems 906 associated with users.

In addition, the vehicle subsystem 908 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

In particular embodiments, the vehicle subsystem 908 may include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 908 may include a communication device capable of communicating with the client system 906 and/or the transportation service system 902. For example, the vehicle subsystem 908 can include an on-board computing device communicatively linked to the network 904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable medium storing instructions thereon that, when executed by at least one processor, cause a requestor computing device to:
   display a transportation request graphical user interface comprising a list of destination options;
   detect a user interaction with a destination option in the list of destination options;
   determine that the user interaction meets a threshold, wherein determining that the user interaction meets the threshold comprises at least one of determining that the user interaction moves past a threshold position within the transportation request graphical user interface, determining that the user interaction exceeds a threshold amount of touch pressure, or determining that the user interaction exceeds a threshold amount of hold-time; and
   in response to determining that the user interaction meets the threshold, generate information associated with a transportation request.

2. The non-transitory computer-readable medium as recited in claim 1, further comprising instructions that, when executed by the at least one processor, cause the requestor computing device to display the list of destination options based on an analysis of a request history associated with the requestor computing device.

3. The non-transitory computer-readable medium as recited in claim 2, further storing instructions thereon that, when executed by the at least one processor, cause the requestor computing device to identify the list of destination options based on a request matching pattern associated with the requestor computing device, wherein the request matching pattern comprises one or more completed transportation entries, wherein each completed transportation entry comprises a pickup time and location, and an associated destination location.

4. The non-transitory computer-readable medium as recited in claim 3, further storing instructions thereon that, when executed by the at least one processor, cause the requestor computing device to receive a plurality of scored destination options,
   wherein displaying the transportation request graphical user interface comprising the list of destination options comprises displaying the transportation request graphical user interface comprising a list of one or more of the plurality of scored destination options with the highest scores, and
   wherein a score associated with each of the plurality of scored destination options is based on one or more of a correlation between the scored destination option and the request matching pattern, a correlation between the scored destination option and monitored activity information associated with the requestor computing device, or a level of social media activity associated with an event correlated with the scored destination option.

5. The non-transitory computer-readable medium as recited in claim 1, further comprising instructions that, when executed by the at least one processor, cause the requestor computing device to, in response to determining that the user interaction meets the threshold, generate the information associated with the transportation request by:
   determining an estimated cost for the transportation request in association with the destination option with which the user interaction was detected; and
   display the estimated cost for the transportation request adjacent to the destination option with which the user interaction was detected.

6. The non-transitory computer-readable medium as recited in claim 1, further comprising instructions that, when executed by the at least one processor, cause the requestor computing device to,
   in response to determining that the user interaction meets the threshold, generate the information associated with the transportation request by analyzing a request history associated with the requestor computing device to determine a predicted transportation classification associated with the requestor computing device; and
   display the predicted transportation classification associated with the requestor computing device adjacent to the destination option with which the user interaction was detected.

7. The non-transitory computer-readable medium as recited in claim 1, further comprising instructions that, when executed by the at least one processor, cause the requestor computing device to:
   determine that the user interaction meets a second threshold; and
   in response to determining that the user interaction meets the second threshold, generate and send a transportation request comprising the destination option with which the user interaction was detected.

8. A requestor computing device comprising:
   at least one processor; and
   at least one non-transitory computer-readable storage medium storing instructions thereon that, when executed by the at least one processor, cause the requestor computing device to:
   display a transportation request graphical user interface comprising a list of destination options;
   detect a user interaction with a destination option in the list of destination options;
   determine that the user interaction meets a threshold, wherein determining that the user interaction meets the threshold comprises at least one of determining that the user interaction moves past a threshold position within the transportation request graphical user interface, determining that the user interaction exceeds a threshold amount of touch pressure, or determining that the user interaction exceeds a threshold amount of hold-time; and
   in response to determining that the user interaction meets the threshold, generate information associated with a transportation request.

9. The requestor computing device as recited in claim 8, further storing instructions that cause the requestor computing device to display the transportation request graphical user interface comprising the list of destination options based on an analysis of a request history associated with the requestor computing device.

10. The requestor computing device as recited in claim 9, further storing instructions that cause the requestor computing device to identify the list of destination options based on a request matching pattern associated with the requestor computing device, wherein the request matching pattern comprises one or more completed transportation entries, wherein each completed transportation entry comprises a pickup time and location, and an associated destination location.

11. The requestor computing device as recited in claim 10, further storing instructions that cause the requestor computing device to receive a plurality of scored destination options,
   wherein displaying the transportation request graphical user interface comprising the list of destination options comprises displaying the transportation request graphical user interface comprising a list of one or more of the plurality of scored destination options with the highest scores, and
   wherein a score associated with each of the plurality of scored destination options is based on one or more of a correlation between the scored destination option and the request matching pattern, a correlation between the scored destination option and monitored activity information associated with the requestor computing device, or a level of social media activity associated with an event correlated with the scored destination option.

12. The requestor computing device as recited in claim 8, further storing instructions that cause the requestor computing device to,
   in response to determining that the user interaction meets the threshold, generate the information associated with the transportation request by determining an estimated cost for the transportation request in association with the destination option with which the user interaction was detected; and
   display the estimated cost for the transportation request adjacent to the destination option with which the user interaction was detected.

13. The requestor computing device as recited in claim 8, further storing instructions that cause the requestor computing device to, in response to determining that the user interaction meets the threshold, generate the information associated with the transportation request by:

analyzing a request history associated with the requestor computing device to determine a predicted transportation classification associated with the requestor computing device; and display the predicted transportation classification associated with the requestor computing device adjacent to the destination option with which the user interaction was detected.

14. The requestor computing device as recited in claim 8, further storing instructions that cause the requestor computing device to:

determine that the user interaction meets a second threshold; and in response to determining that the user interaction meets the second threshold, generate and send a transportation request comprising the destination option with which the user interaction was detected.

15. A method comprising:

displaying, by a requestor computing device, a transportation request graphical user interface comprising a list of destination options;

detecting, by the requestor computing device, a user interaction with a destination option in the list of destination options;

determining, by the requestor computing device, that the user interaction meets a threshold, wherein determining that the user interaction meets the threshold comprises at least one of determining that the user interaction moves past a threshold position within the transportation request graphical user interface, determining that the user interaction exceeds a threshold amount of touch pressure, or determining that the user interaction exceeds a threshold amount of hold-time; and in response to determining that the user interaction meets the threshold, generating, by the requestor computing device, information associated with a transportation request.

16. The method as recited in claim 15, further comprising displaying the list of destination options based on an analysis of a request history associated with the requestor computing device.

17. The method as recited in claim 16, further comprising identifying the list of destination options based on a request matching pattern associated with the requestor computing device, wherein the request matching pattern comprises one or more completed transportation entries, wherein each completed transportation entry comprises a pickup time and location, and an associated destination location.

18. The method as recited in claim 15, further comprising, in response to determining that the user interaction meets the threshold, generating the information associated with the transportation request by:

determining an estimated cost for the transportation request in association with the destination option with which the user interaction was detected; and displaying the estimated cost for the transportation request adjacent to the destination option with which the user interaction was detected.

19. The method as recited in claim 15, further comprising, in response to determining that the user interaction meets the threshold, generating the information associated with the transportation request by analyzing a request history associated with the requestor computing device to determine a predicted transportation classification associated with the requestor computing device; and displaying the predicted transportation classification associated with the requestor computing device adjacent to the destination option with which the user interaction was detected.

20. The method as recited in claim 15, further comprising:

determining that the user interaction meets a second threshold; and in response to determining that the user interaction meets the second threshold, generating and sending a transportation request comprising the destination option with which the user interaction was detected.

* * * * *